United States Patent [19]
Uzawa et al.

[11] Patent Number: 5,572,277
[45] Date of Patent: Nov. 5, 1996

[54] ZOOM LENS

[75] Inventors: Tsutomu Uzawa, Hidaka; Naoki Fujii; Atsujiro Ishii, both of Hachioji, all of Japan

[73] Assignee: Olympus Optical Co., Ltd., Tokyo, Japan

[21] Appl. No.: 258,925

[22] Filed: Jun. 13, 1994

[30] Foreign Application Priority Data

Jun. 15, 1993 [JP] Japan ................................ 5-143238

[51] Int. Cl.⁶ .................................................. G02B 15/14
[52] U.S. Cl. ................................... 359/686; 359/773
[58] Field of Search ................................. 359/686, 687, 359/676, 773, 774, 683

[56] References Cited

U.S. PATENT DOCUMENTS

| | | | |
|---|---|---|---|
| 4,634,236 | 1/1987 | Masumoto | 359/687 |
| 5,146,366 | 9/1992 | Mukaiya | 359/683 |
| 5,313,331 | 5/1994 | Mihara | 359/687 |

FOREIGN PATENT DOCUMENTS

| | | |
|---|---|---|
| 57-5012 | 1/1982 | Japan . |
| 4296809 | 10/1992 | Japan . |

*Primary Examiner*—Georgia Y. Epps
*Assistant Examiner*—Dawn-Marie Bey
*Attorney, Agent, or Firm*—Cushman, Darby & Cushman

[57] ABSTRACT

The invention provides a zoom lens system having a zoom ratio as high as about 8 to 12 but is of wide field angle and small size, and is suitable for use on a video camera, said zoom lens system comprising a positive first lens unit L1 which is movable in an orbit, said orbit displaceable toward objet side at the telephoto end position rather than at the wide-angle end position, a negative second lens unit L2 which is movable in an orbit, said orbit displaceable toward the image side at the telephoto end position rather than at the wide-angle end position, a positive third lens unit L3 which is movable in an orbit, said orbit displaceable toward the object side at the telephoto end position rather than at the wide-angle end, and a positive or negative fourth lens unit L4 which is movable, and conforming to $$2.6 < f_I/(f_W f_T)^{1/2} < 6 \quad (1)$$

$$-1.2 < \beta_{2T} < -0.7 \quad (2)$$

$$3.2 < \beta_{2T}/\beta_{2W} < 8 \quad (3)$$

where:
$f_I$ is the focal length of the first lens unit,
$f_W$ and $f_T$ are the focal lengths of the overall system at the wide-angle and telephoto ends, respectively, and
$\beta_{2W}$ and $\beta_{2T}$ are the image-formation magnifications of the second lens unit at the wide-angle and telephoto ends, respectively.

15 Claims, 14 Drawing Sheets

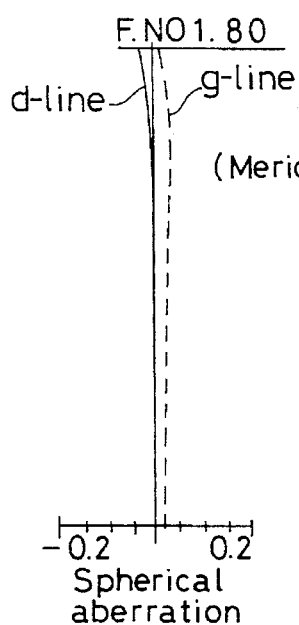
FIG. 3(a) F.NO 1.80
d-line, g-line
−0.2  0.2
Spherical aberration
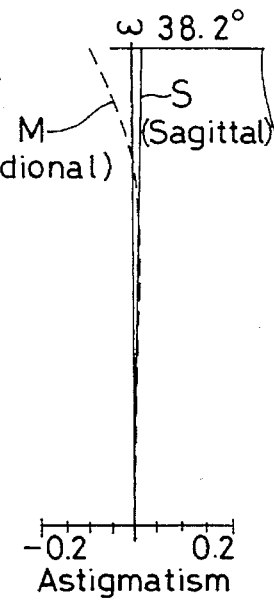
FIG. 3(b) ω 38.2°
M (Meridional), S (Sagittal)
−0.2  0.2
Astigmatism
FIG. 3(c) ω 38.2°
−5.0  5.0
Distortion (%)
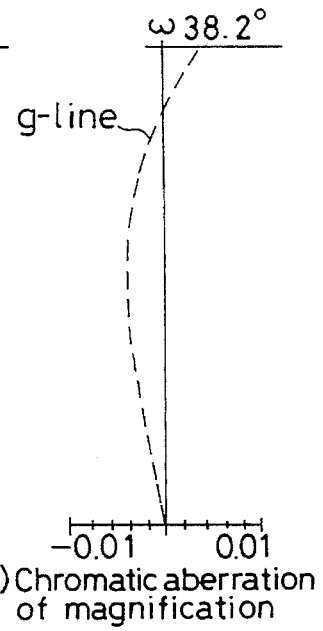
FIG. 3(d) ω 38.2°
g-line
−0.01  0.01
Chromatic aberration of magnification
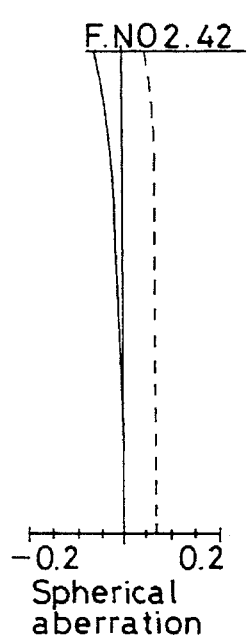
FIG. 3(e) F.NO 2.42
−0.2  0.2
Spherical aberration
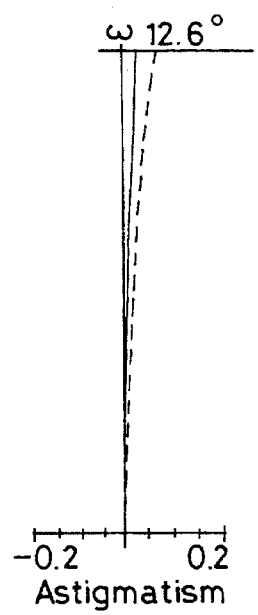
FIG. 3(f) ω 12.6°
−0.2  0.2
Astigmatism
FIG. 3(g) ω 12.6°
−5.0  5.0
Distortion (%)
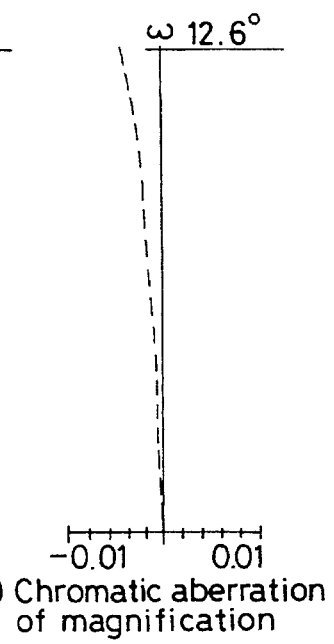
FIG. 3(h) ω 12.6°
−0.01  0.01
Chromatic aberration of magnification

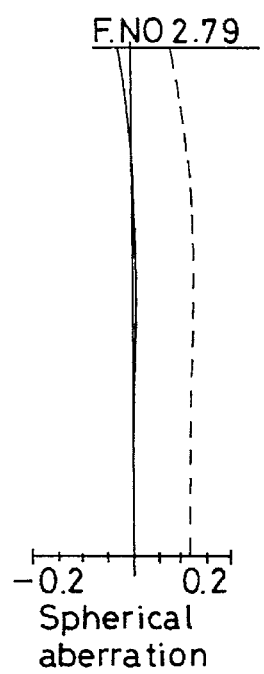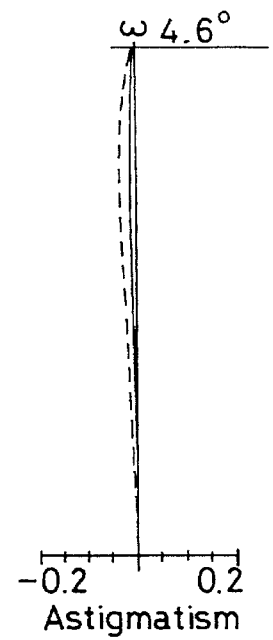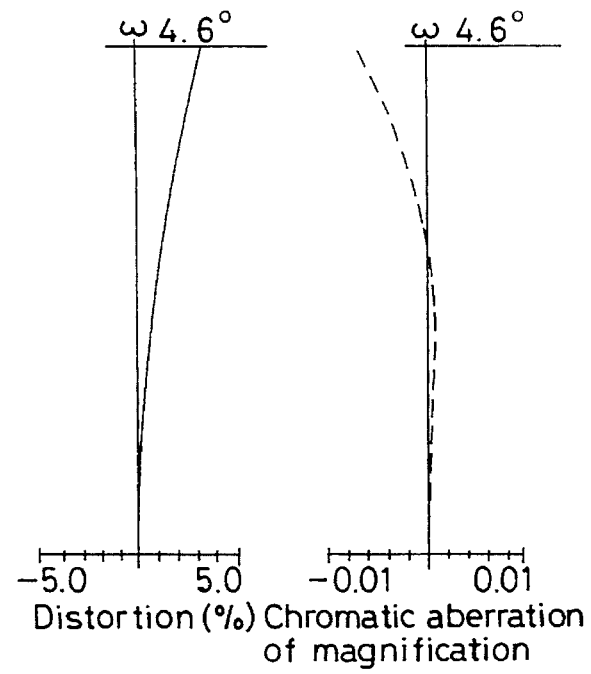

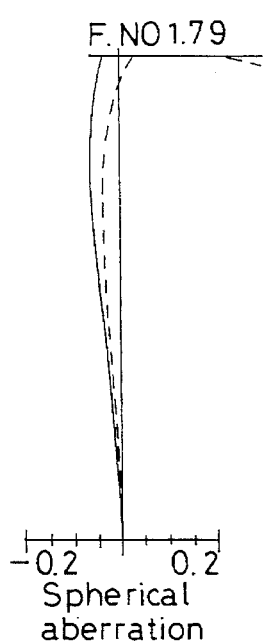
FIG. 4(a)
F.NO 1.79
−0.2  0.2
Spherical aberration
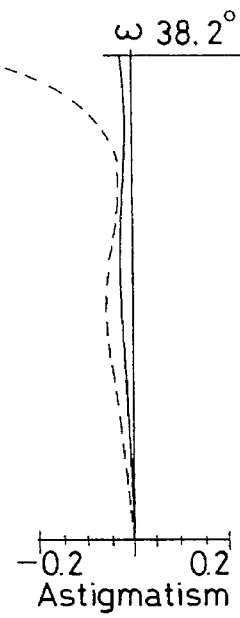
FIG. 4(b)
ω 38.2°
−0.2  0.2
Astigmatism
FIG. 4(c)
ω 38.2°
−5.0  5.0
Distortion (%)
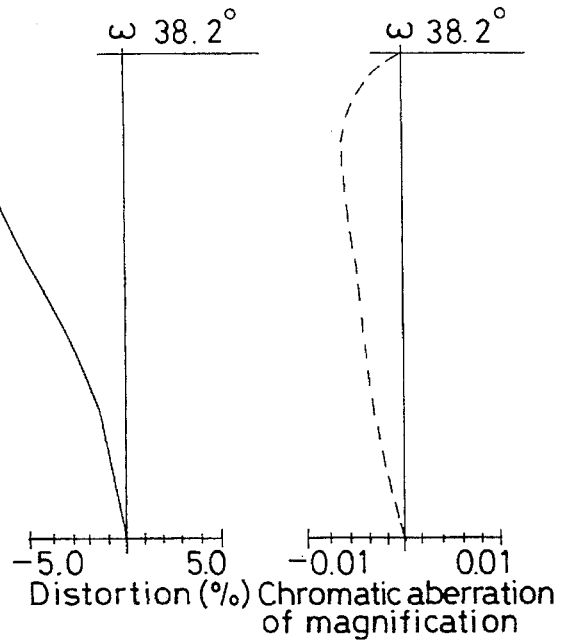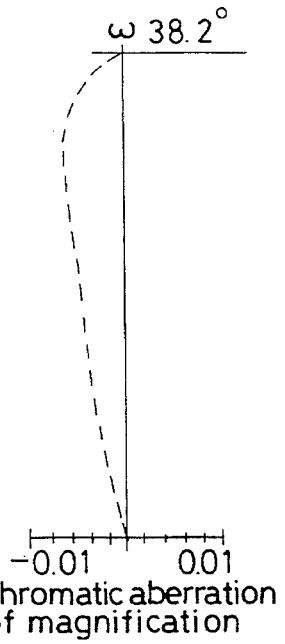
FIG. 4(d)
ω 38.2°
−0.01  0.01
Chromatic aberration of magnification
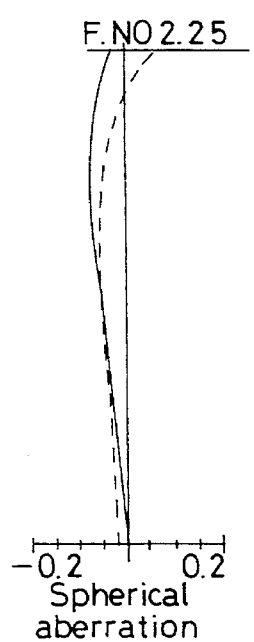
FIG. 4(e)
F.NO 2.25
−0.2  0.2
Spherical aberration
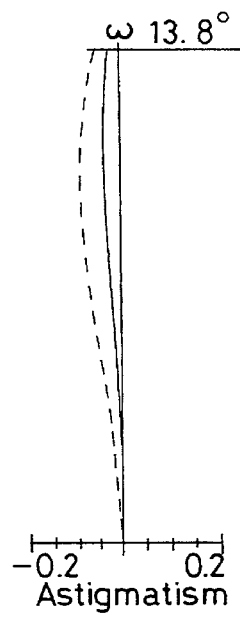
FIG. 4(f)
ω 13.8°
−0.2  0.2
Astigmatism
FIG. 4(g)
ω 13.8°
−5.0  5.0
Distortion (%)
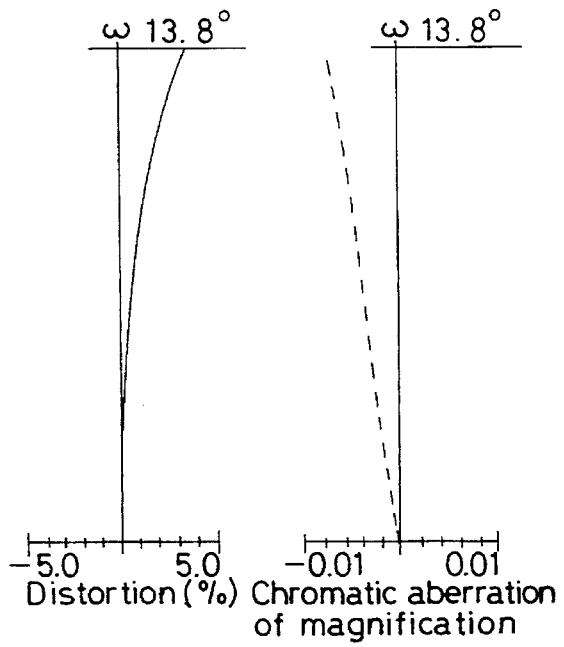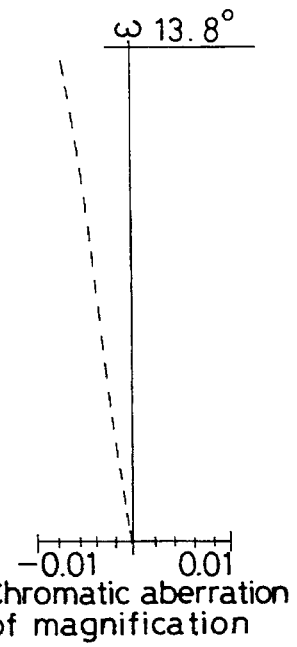
FIG. 4(h)
ω 13.8°
−0.01  0.01
Chromatic aberration of magnification

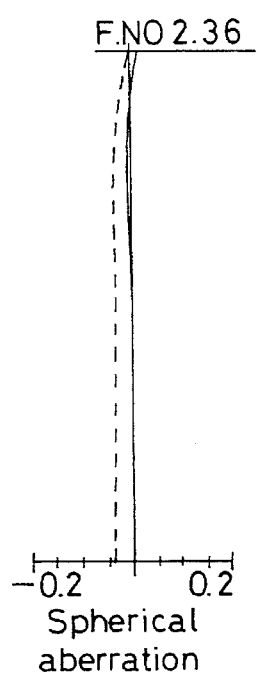 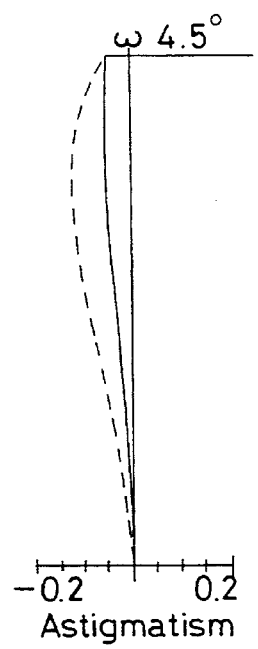 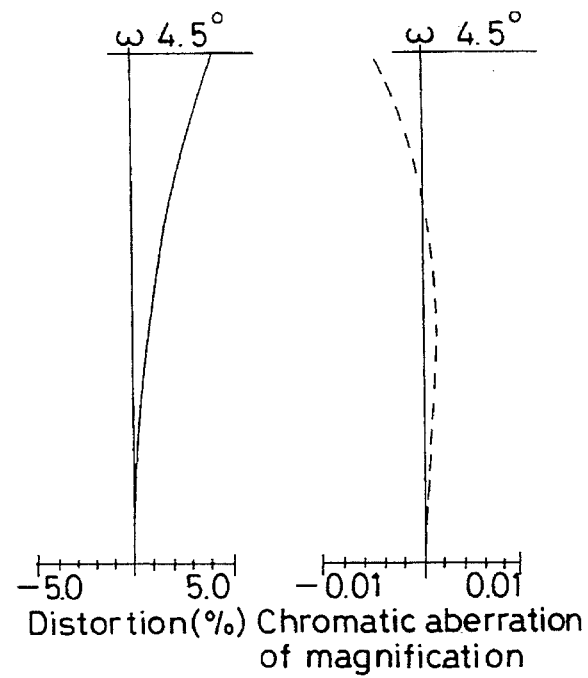
FIG. 4(i) Spherical aberration F.NO 2.36
FIG. 4(j) Astigmatism ω 4.5°
FIG. 4(k) Distortion(%) ω 4.5°
FIG. 4(l) Chromatic aberration of magnification ω 4.5°

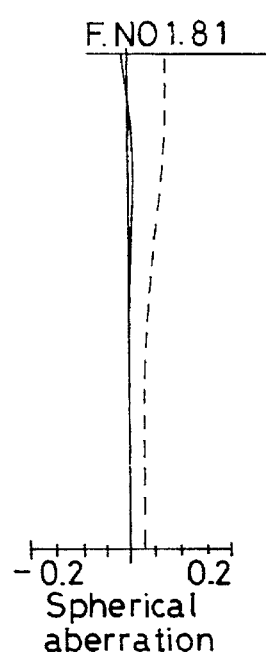
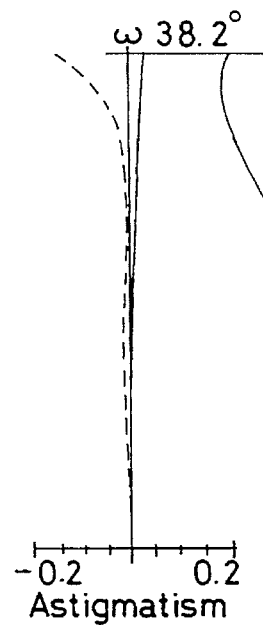
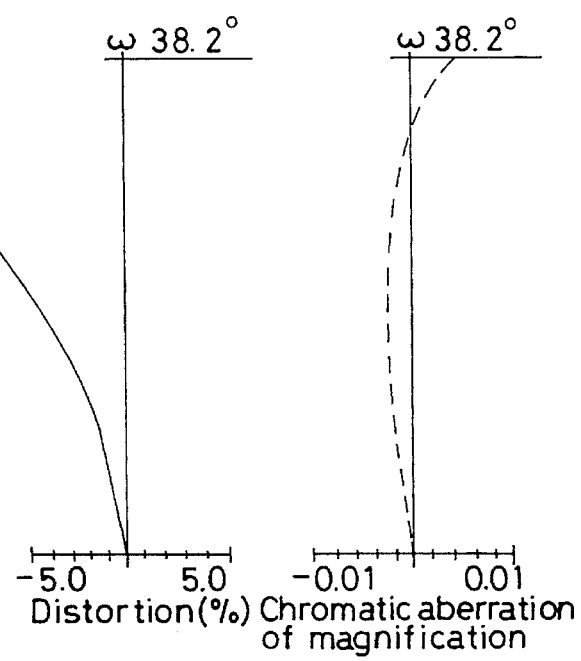
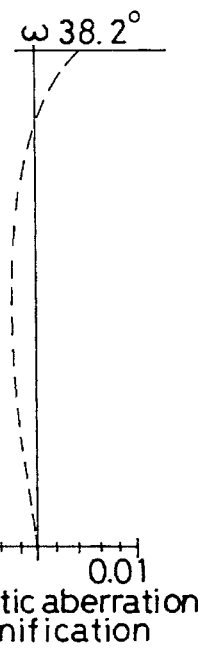
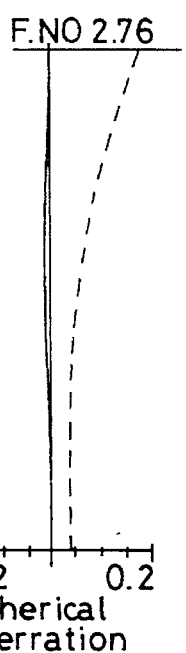
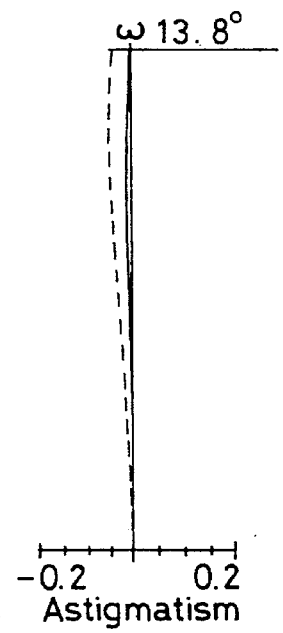
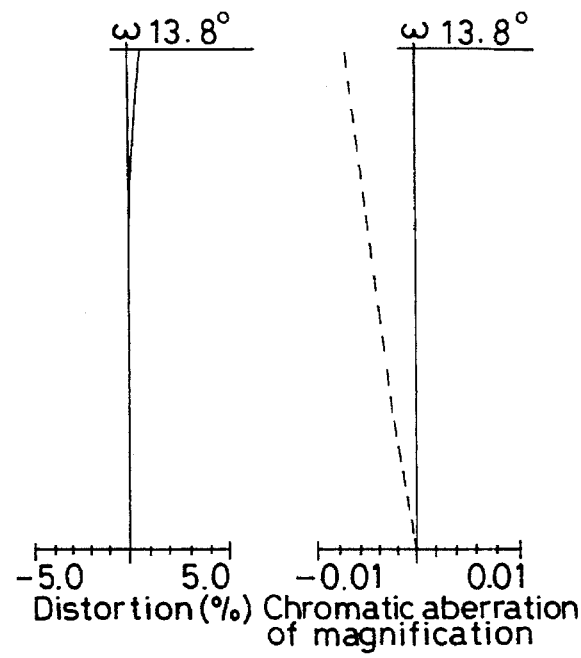
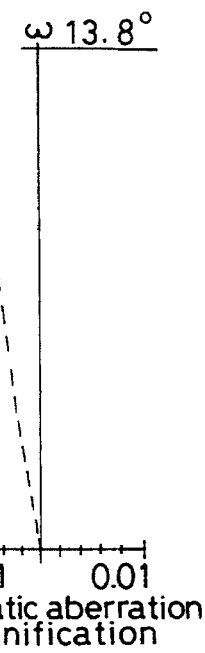

FIG. 5(i)   FIG. 5(j)   FIG. 5(k)   FIG. 5(l)
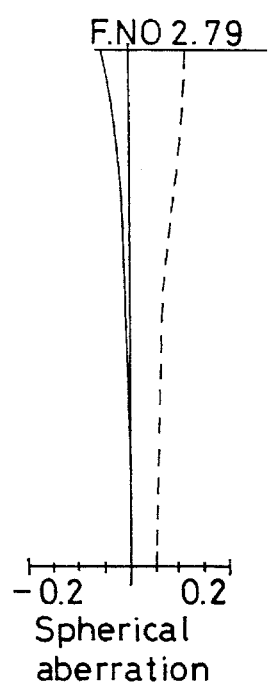
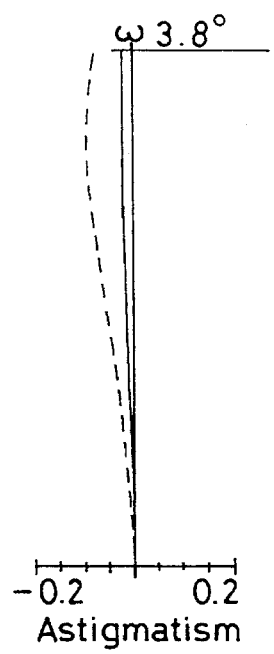
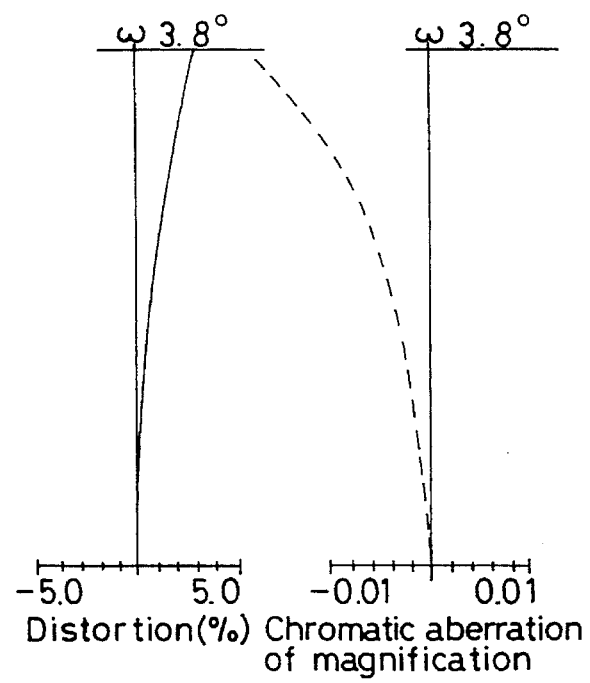
Spherical aberration   Astigmatism   Distortion(%)   Chromatic aberration of magnification FIG. 6(a)  FIG. 6(b)  FIG. 6(c)  FIG. 6(d)
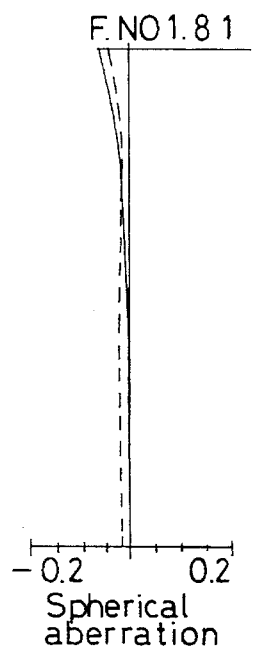
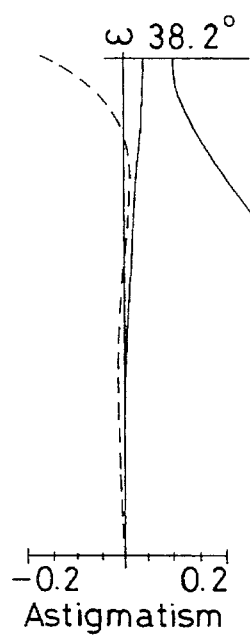
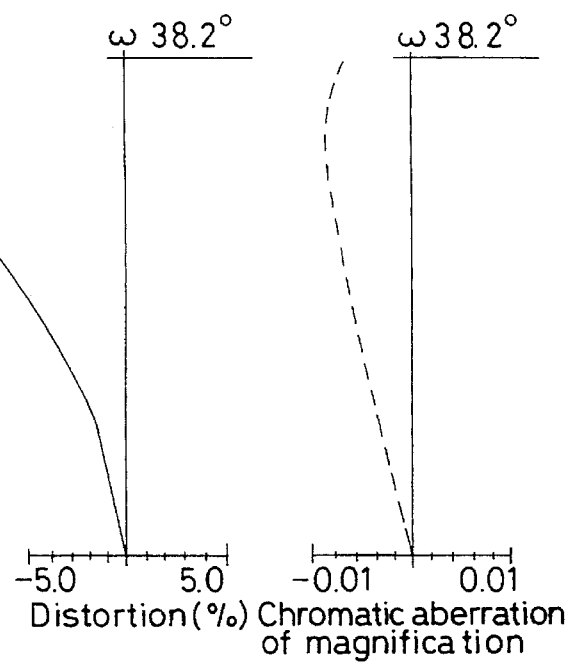
Spherical aberration   Astigmatism   Distortion(%)   Chromatic aberration of magnification
FIG. 6(e)  FIG. 6(f)  FIG. 6(g)  FIG. 6(h)
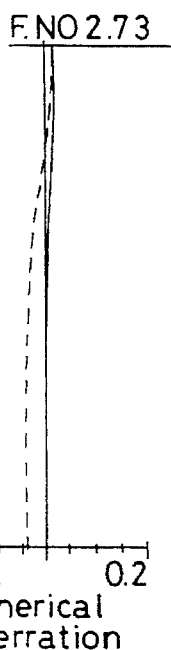
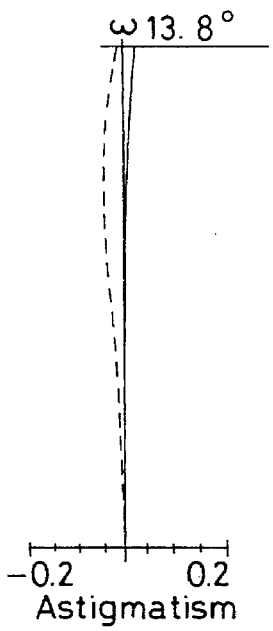
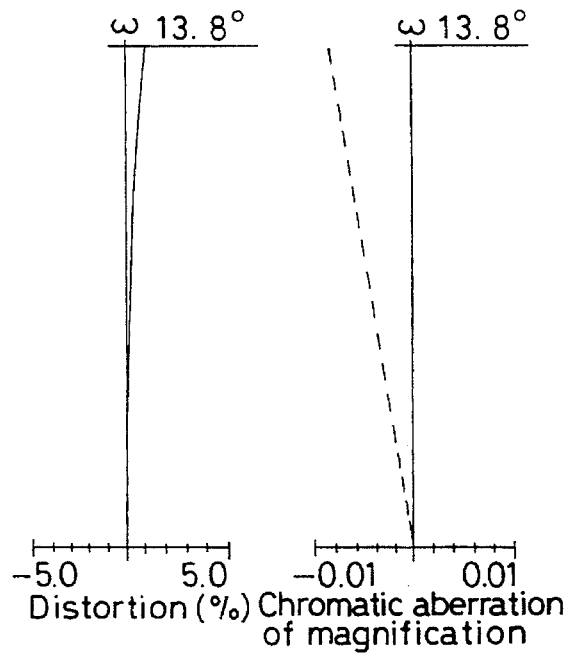
Spherical aberration   Astigmatism   Distortion(%)   Chromatic aberration of magnification FIG. 6(i) FIG. 6(j) FIG. 6(k) FIG. 6(l)
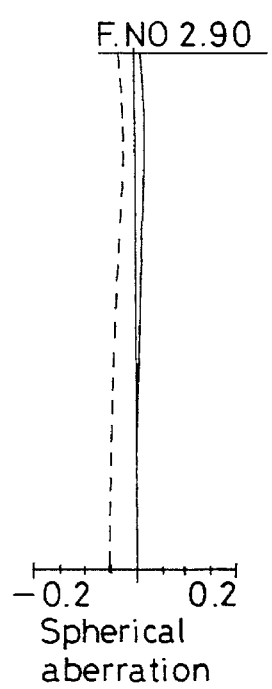
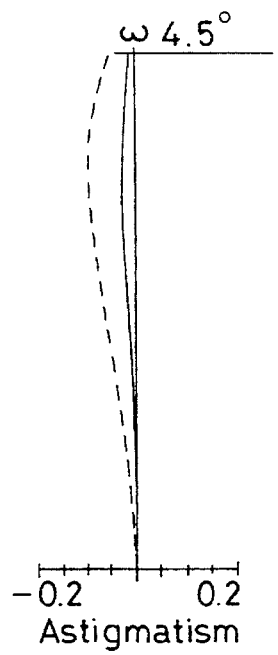
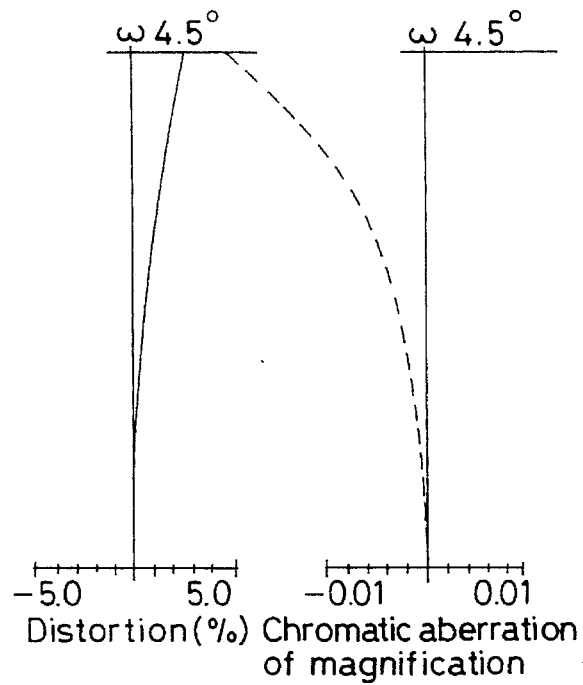

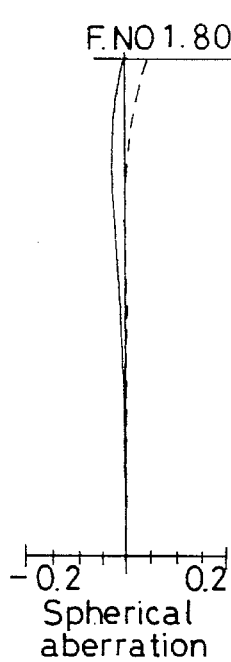
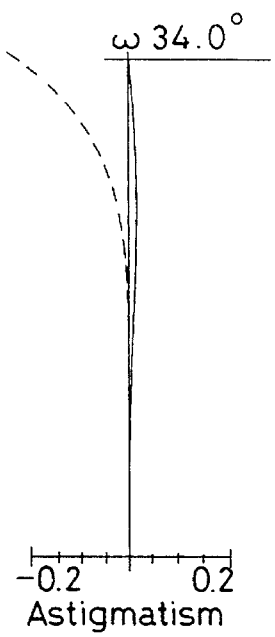
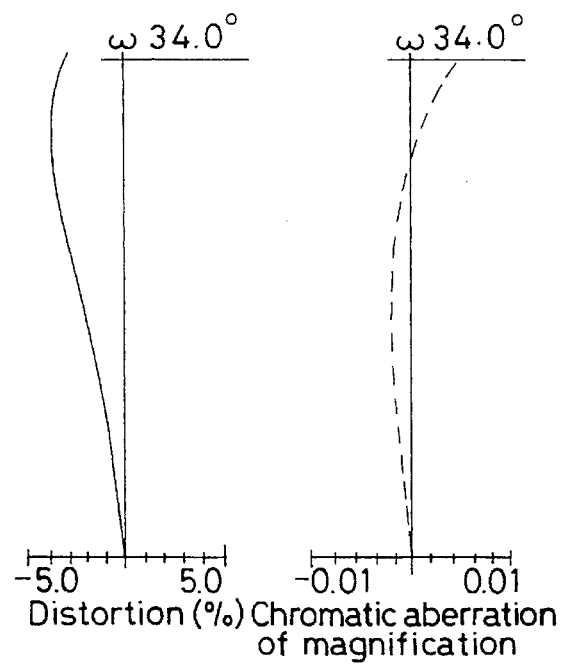
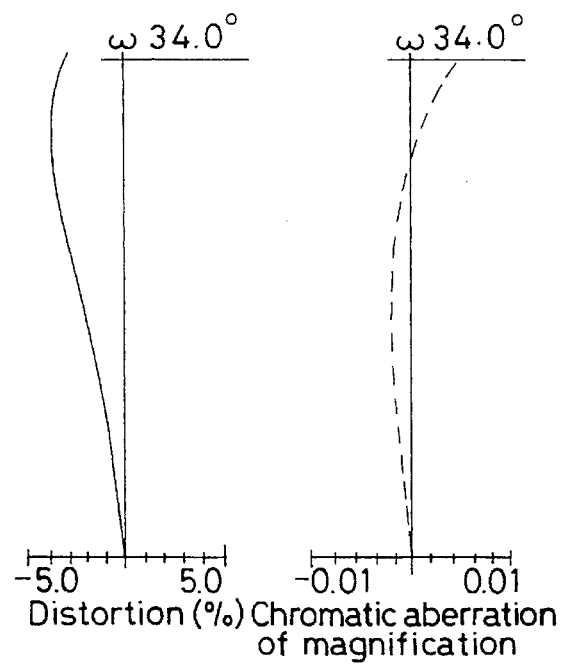
FIG. 7(a)  FIG. 7(b)  FIG. 7(c)  FIG. 7(d)
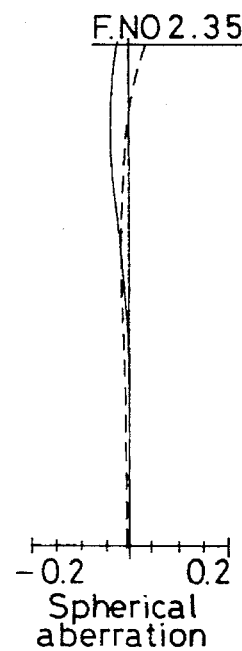
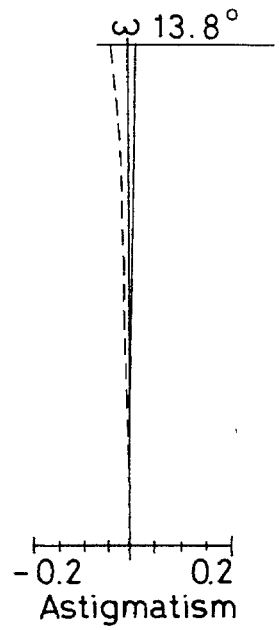
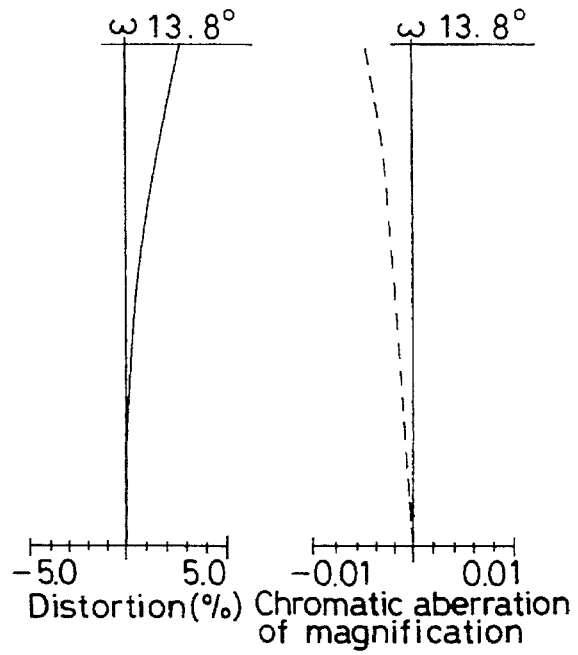
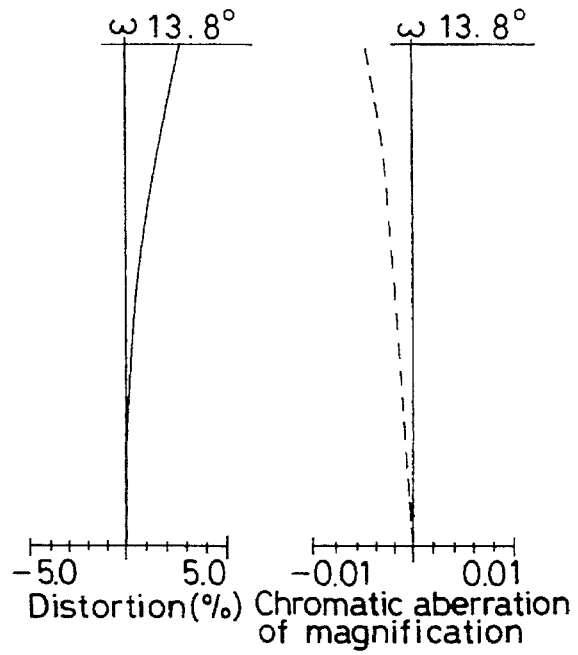
FIG. 7(e)  FIG. 7(f)  FIG. 7(g)  FIG. 7(h)

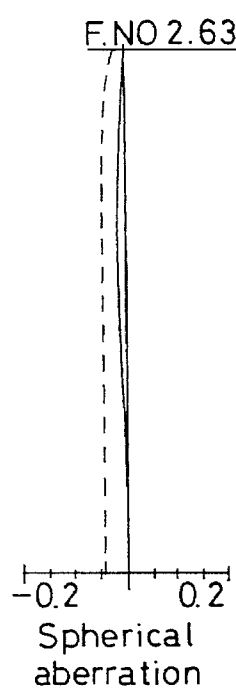
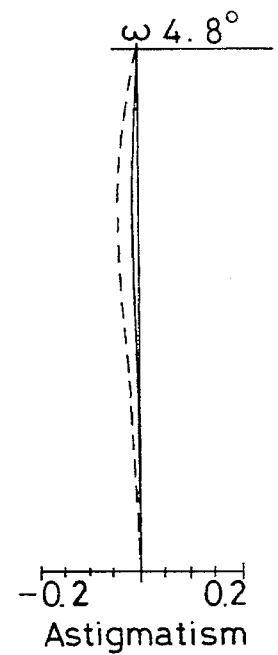
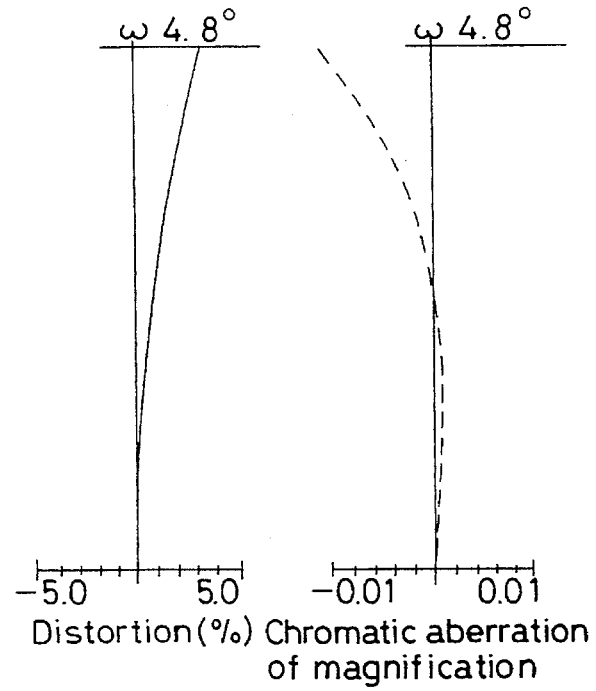
FIG. 7(i)  FIG. 7(j)  FIG. 7(k)  FIG. 7(l)
Spherical aberration  Astigmatism  Distortion(%)  Chromatic aberration of magnification

ZOOM LENS

BACKGROUND OF THE INVENTION

This invention relates generally to a zoom lens, and more particularly to a zoom lens system designed for use on video cameras.

In recent years video cameras have decreased in size and weight and, with this, zoom lenses for use on them are now required to decrease in size and weight as well. On the other hand, these zoom lenses are required to have a higher zoom ratio and be made wider-angle (i.e., to have a shorter focal length and hence a field covering a wider angle). It is thus now demanded to achieve such high performance simultaneously with the achievement of size and weight reductions.

For instance, JP-A 4-296809 discloses one typical zoom lens for video cameras, and states that such a zoom lens, albeit small, can achieve a high zoom ratio, and a shorter focal length and hence a field covering a wider angle. The disclosed zoom lens is of a zoom type wherein all lens groups are movable along the optical axis during zooming.

Of zoom lenses for a silver salt type of photographic cameras, on the other hand, a zoom lens of the type that all lens units are movable for zooming is set forth in JP-A 57-5012 for instance.

The former conventional zoom lens has a zoom ratio as high as about 12, but is inadequate in terms of the half field angle at the wide-angle end, as can be seen from $\omega=31.5°$, and the latter one has an enough half field angle at the wide-angle end, as can be seen from $\omega=37°$, but has a zoom ratio of about 3 that is insufficient for use on a video camera.

SUMMARY OF THE INVENTION

The present invention has been made so as to provide a solution to the above problems the prior art has, and has for its object the provision of a compact zoom lens system has a zoom ratio as high as about 8 to 12 and achieves a wide field angle as well.

According to the invention, the object mentioned above is achieved by the provision of a zoom lens system comprising, in order from the object side, a first lens unit which is movable along the optical axis and in zooming from the wide-angle end to the telephoto end, said first lens unit being relatively displaceable toward the object side at the telephoto end position rather than at the wide-angle end position, and has positive refracting power as a whole, a second lens unit which is movable along the optical axis and in an orbit for zooming from the wide-angle end to the telephoto end, said orbit being relatively displaceable toward the image side at the wide-angle end position, and has negative refracting power as a whole, a third lens unit which is movable along the optical axis and in an orbit for zooming from the wide-angle end to the telephoto end, said orbit being relatively displaceable toward the object side at the telephoto end position rather than at the wide-angle end position, and has positive refracting power as a whole, and a fourth lens unit which is movable along the optical axis for zooming from the wide-angle end to the telephoto end, and has positive or negative refracting power as a whole, and conforming to the following conditions:

$$2.6 < f_I/(f_W f_T)^{1/2} < 6 \tag{1}$$

$$-1.2 < \beta_{2T} < -0.7 \tag{2}$$

$$3.2 < \beta_{2T}/\beta_{2W} < 8 \tag{3}$$

Here, $f_I$ is the focal length of the first lens unit, $f_W$ and $f_T$ are the focal lengths of the overall system at the wide-angle and telephoto ends, respectively, and $\beta_{2W}$ and $\beta_{2T}$ are the image-formation magnifications of the second lens unit at the wide-angle and telephoto ends, respectively.

Another zoom lens system of the invention comprises, in order from the object side, a first lens unit which is movable along the optical axis and in zooming from the wide-angle end to the telephoto end, said first lens unit being relatively displaceable toward the object side at the telephoto end position rather than at the wide-angle end position, and has positive refracting power as a whole, a second lens unit which is movable along the optical axis and in an orbit for zooming from the wide-angle end to the telephoto end, said orbit being relatively displaceable toward the image side at the telephoto end position rather than at the wide-angle end position, and has negative refracting power as a whole, a third lens unit which is movable along the optical axis and in an orbit for zooming from the wide-angle end to the telephoto end, said orbit being relatively displaceable toward the object side at the telephoto end position rather than at the wide-angle end position, and has positive refracting power as a whole, and a fourth lens unit which is movable along the optical axis for zooming from the wide-angle end to the telephoto end, and has positive or negative refracting power as a whole, said third lens unit including a plurality of lenses, of which the lens proximate to the image side is of double-convex shape.

An image pickup device is substantially located on the image surface formed by the zoom lens system, so that the image pickup device can be moved along the optical axis for focusing.

Preferably, the fourth lens unit is moved such that the separation between it and the third lens unit is layer at the telephoto end than at the wide-angle end.

More preferably, each zoom lens system conforms to the following condition (4):

$$1.6 < (\beta_{2T} \cdot \beta_{3W} \beta_{4W})/(\beta_{2W} \cdot \beta_{3T} \beta_{4T}) < 4.5 \tag{4}$$

where $\beta_{iW}$ is the magnification of the ith lens unit at the wide-angle end, and $\beta_{iT}$ is the magnification of the ith lens unit at the telephoto end.

Still more preferably, each zoom lens system conforms to the following condition (5):

$$0.2 < |X_2/X_1| < 1.0 \tag{5}$$

where $X_1$ and $X_2$ are the amounts of movement of the first and second lens units from the wide-angle end to the telephoto end, respectively.

Preferably, the third lens unit includes positive, negative and positive lenses in order from the object side.

Preferably, the third lens unit includes at least one aspheric surface with the positive refracting power becoming weak as it is spaced away from the optical axis or with the negative refracting power becoming strong as it is spaced away from the optical axis.

Preferably, the fourth lens unit includes one lens, said lens having at least one aspheric surface with the positive refracting power becoming weak as it is spaced away from the optical axis or with the negative refracting power becoming strong as it is spaced away from the optical axis.

Also, the third lens unit may include a positive lens having a convex surface of strong curvature on the object side, a negative meniscus lens convex on the object side, and a double-convex lens.

Still more preferably, each zoom lens system conforms to the following conditions (6) and (7):

$$0.7 < \beta_{4T} < 1.4 \quad (6)$$

$$-0.2 < f_3/f_4 < 0.4 \quad (7)$$

where $\beta_{4T}$ is the magnification of the fourth lens unit at the telephoto end, and $f_i$ is the focal length of the ith lens unit.

In the rear of the fourth lens unit there may be located an optical filter, for which a low-pass filter for Moiré, an infrared ray cut filter and so on, may be used.

Additionally, the present invention encompasses an electronic imaging type of zoom lens system including an objective lens assembly, an image pickup device located on a substantial image surface formed by said objective lens assembly and an image display means for forming a finder image for observation from an image signal obtained by said image pickup device, wherein said objective lens assembly includes, in order from the object side, a first lens unit which is movable along the optical axis and in zooming from the wide-angle end to the telephoto end, said first lens unit being relatively displaceable toward the object side at the telephoto end position rather than at the wide-angle end position, and has positive refracting power as a whole, a second lens unit which is movable along the optical axis and in an orbit for zooming from the wide-angle end to the telephoto end, said orbit being relatively displaceable toward the image side at the telephoto end position rather than at the wide-angle end position, and has negative refracting power as a whole, a third lens unit which is movable along the optical axis and in an orbit for zooming from the wide-angle end to the telephoto end, said orbit being relatively displaceable toward the object side at the telephoto end position rather than at the wide-angle end position, and has positive refracting power as a whole, and a fourth lens unit which is movable along the optical axis for zooming from the wide-angle end to the telephoto end, and has positive or negative refracting power as a whole.

Reference will now be made to why the above arrangements are adopted and how they work.

The first and second lens units are moved toward the object and image sides, respectively, for zooming from the wide-angle end to the telephoto end, while the positive refracting power of the first lens unit is kept relatively small so as to meet Conditional Inequality (1), whereby the height of the off-axis ray passing through the first and second lens unit is reduced for the achievement of a wide-angle, compact system.

If the upper limit of 6 is exceeded, the efficiency of zooming will then drop, making it impossible to achieve a high zoom ratio. If the lower limit of 2.6 is not reached, the height of the off-axis ray will then increase, making compactness difficult.

Making the positive refracting power of the first lens unit small is tantamount to increasing the focal length $f_1$ of the first lens unit; when the system is made wide-angle by making the overall focal length short, it is required to reduce the absolute values of the magnifications of the 2nd and subsequent lens units. In other words, it is required to meet Conditional Inequality (2) that defines the image-formation magnification of the second lens unit at the telephoto end. If the upper limit of −0.7 is exceeded, the efficiency of zooming of the second lens unit will then drop. If the lower limit of −1.2 is not reached, on the contrary, it will then be necessary to reduce the magnifications of the 2nd and subsequent lens units as much as possible, making it difficult to obtain a sufficient back focus for locating an optical filter, etc.

To achieve a high zoom ratio, the first and second lens units are moved while the third lens unit is moved toward the object side from the wide-angle end to the telephoto end, thereby allowing the third lens unit to take a zooming role.

Conditional Inequality (3) defines the zoom ratio shared by the second lens unit in the overall zooming action. If the lower limit of 3.2 is not reached, it will then be difficult for the overall lens system to have a high zoom ratio. If the upper limit of 8 is exceeded, there will then be an increase in the amounts of movement of the first and second lens units, resulting in an increase in the diameters of the first and second lens units and hence in the overall lens length.

According to the lens system of the invention, aberrations ascribable to the third lens unit are primarily corrected by the fourth lens unit. Aberration variations due to the movement of the third lens unit are overall reduced by the movement of the fourth lens unit. Preferably, the fourth lens unit should be moved such that the separation between it and the third lens unit is increased at the telephoto end rather than at the wide-angle end.

According to what has been described above, it is possible to achieve the end zoom lens system.

More preferably, the following conditional inequalities (4) and (5) should be satisfied.

$$1.6 < (\beta_{2T} \cdot \beta_{3W} \cdot \beta_{4W})/(\beta_{2W} \cdot \beta_{3T} \cdot \beta_{4T}) < 4.5 \quad (4)$$

where $\beta_{iW}$ is the magnification of the ith lens unit at the wide-angle end, and $\beta_{iT}$ is the magnification of the ith lens unit at the telephoto end.

$$0.2 < |X_2/X_1| < 1.0 \quad (5)$$

where $X_1$ and $X_2$ are the amount of movement of the first and second lens units from the wide-angle end to the telephoto end, respectively.

Conditional Inequality (4) correlates with Inequality (3), and defines the proportion of the zooming role shared by the second lens unit to the zooming roles shared by the third and subsequent lens units. If the upper limit of 4.5 is exceeded and if the lower limit of 1.6 is not reached, it will then be difficult to keep the amounts of movement of the respective lens units well-balanced, and hence to achieve compactness and reduce aberration variations due to zooming.

Concerning the zooming of the second lens unit, Conditional Inequality (5) defines the ratio of the amount of movement between the first and second lens units. If the upper limit of 1.0 is exceeded, the entrance pupil will then be located farther at the wide-angle end, resulting in an increase in the height of the off-axis ray passing through the first and second lens unit, which is unfavorable for making the length of the system short and rendering the system wide-angle. If the lower limit of 0.2 is not reached, zooming efficiency will not only drop—this is unfavorable for assuring a sufficient zoom ratio, but will also lead to an increase in the overall system length.

Concerning the arrangement of the third and fourth lens unit, it is preferable in view of the correction of aberrations and compactness that the third lens unit be made up of three positive, negative and positive lenses. To reduce the F-number of each lens, the third unit should preferably include an aspheric surface of such shape that the positive refracting power decreases or the negative refracting power increases as it is spaced away from the optical axis.

The fourth lens unit may be made up of one lens. To reduce aberration variations, the fourth lens unit should preferably include an aspheric surface of such shape that the positive refracting power becomes weak or the negative refracting power becomes strong as it is spaced away from the optical axis.

Additionally, the third lens unit may be made up of, in order from the object side, a positive lens having a convex surface of strong curvature on the object side, a negative meniscus lens convex on the object side and a double-convex lens, and this is more favorable for the correction of aberrations correction and compactness.

Then, reference will be made to the focusing of the zoom lens system according to the invention.

Many conventional zoom lenses for use on video cameras make the fourth lens unit movable for focusing, and are more favorable for compactness when compared with those designed to move the first lens unit for focusing. When the fourth lens unit is moved for focusing, however, it is necessary to set the image-formation magnification of the fourth lens unit at a value close to zero, thereby making up for aberration variations due to focusing. This restrictive condition offers an obstacle against reducing the overall system length of the third lens unit and lens units subsequent thereto, which have all an image-formation action.

According to the zoom lens system of the invention, therefore, it is desired that focusing be carried out by moving an image pickup element along the optical axis. As can be seen from FIG. 8(a) that shows the relation of a lens L and an image pickup element D with respect to an infinite object point, the surface of the image pickup element is located at the image-formation position. As can be seen from FIG. 8(b), on the other hand, the image-formation position is movable with respect to a nearby object point, so that focusing can be carried out by moving the image pickup element D along the optical axis. Carrying out focusing by the movement of the image pickup element D is optically equivalent to carrying out focusing by the movement of the overall lens system. However, preference is given to the movement of the image pickup element, because there is a decrease in the weight sharing by the driving part.

FIG. 9 shows the image-formation position of the lens L with respect to the infinite and nearby object points from the wide-angle end to the telephoto end. As can be clearly appreciated from this figure, the image-formation position varies depending on focal length. This means that the movement of the image pickup element D may be achieved in alignment with the image-formation position that moves depending on focal length and object point distance. The lens system of the invention is a zoom lens system; the image-formation position can remain fixed with respect to a certain object distance during zooming. While FIG. 9 shows an example wherein the image-formation position is kept constant with respect to an infinite object point, it is understood that the image-formation position may be kept constant at a finite object point.

The conditions for a zoom lens system, like the zoom lens system of the invention, to which a focusing method by the movement of an image pickup element is applied, are numerically defined as follows:

$$0.7 < \beta_{4T} < 1.4 \quad (6)$$

$$-0.2 < f_3/f_4 < 0.4 \quad (7)$$

where $\beta_{4T}$ is the magnification of the fourth lens unit at the telephoto end, and $f_i$ is the focal length of the ith lens unit.

Conditional Inequality (6) defines the image-formation magnification of the fourth lens unit at the telephoto end, and Conditional Inequality (7) lays down a definition of the focal length ratio between the third and fourth lens units. The image-formation magnification of the fourth lens unit is set at a value approximate to 1, while the refracting power of the third and fourth lens units is primarily shared by the third lens unit. This is favorable for reducing the total length of the third lens unit and lens units subsequent thereto.

If the lower limit—0.7—of Inequality (6) is not reached and if the upper limit—0.4—of Inequality (7) is exceeded, the effect on reducing the total lens system length—which is achieved by focusing with an image pickup element—will become slender. If the upper limit—1.4—of Inequality (6) is exceeded and if the lower limit—−0.2—of Inequality (7) is not reached, compactness will favorably be achieved, but some difficulty will be involved in obtaining a sufficient back focus for locating an optical filter, etc.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(a)–(l) are aberration diagrams showing the spherical aberration, astigmatism, distortion, and chromatic aberration of magnification of Example 1, FIGS. 4(a)–(l) are aberration diagrams of Example 2, similar to FIGS. 3(a)–(l), FIGS. 5(a)–(l) are aberration diagrams of Example 3, similar to FIGS. 3(a)–(l), FIGS. 6(a)–(l) are aberration diagrams of Example 4, similar to FIGS. 3(a)–(l), FIGS. 7(a)–(l) are aberration diagrams of Example 5, similar to FIGS. 3(a)–(l), FIGS. 8(a)–(b) are views for explaining the focusing due to the movement of an image pickup element.

DESCRIPTION OF THE PREFERRED EMBODIMENTS

Figure 1A:
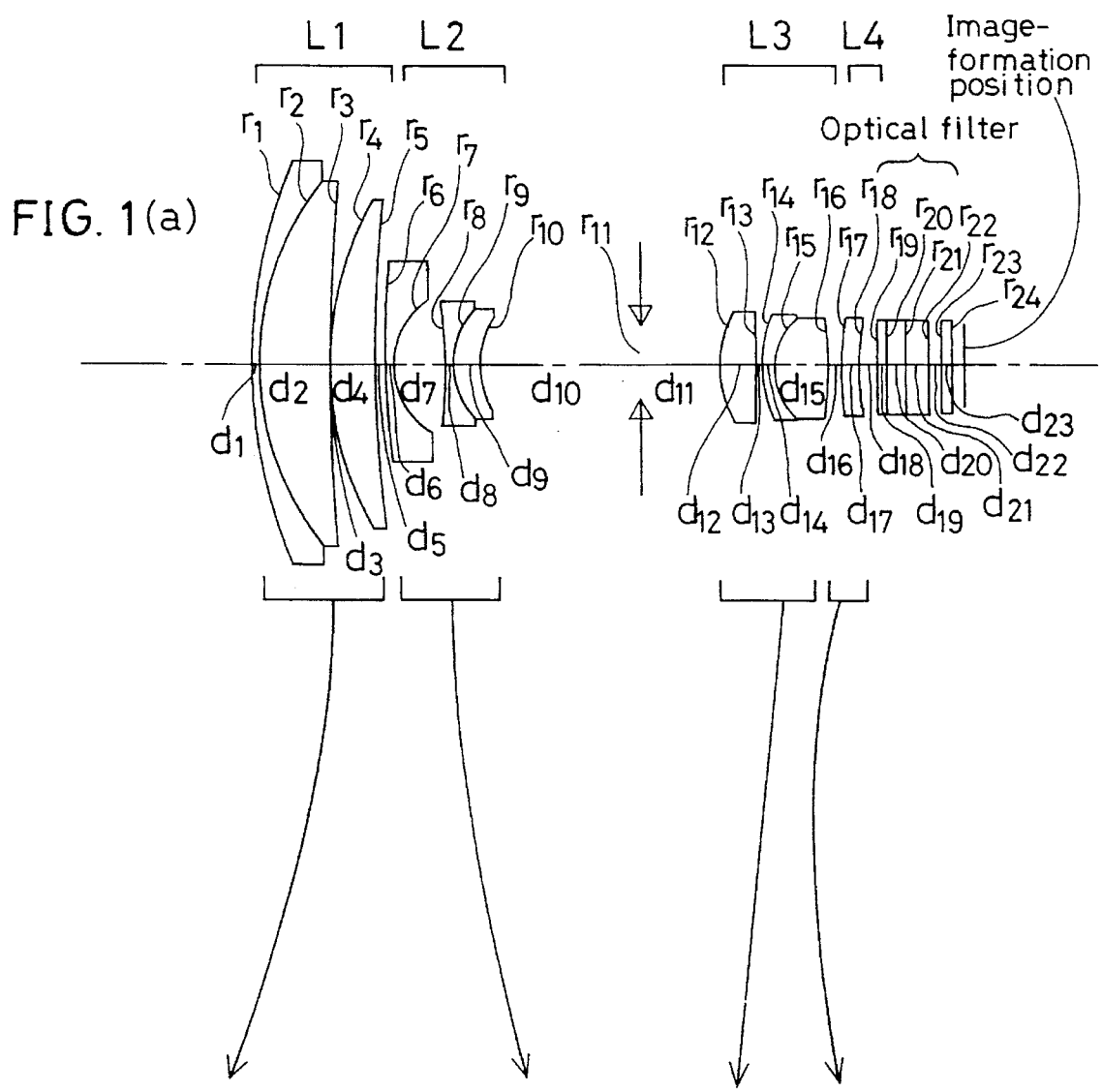
FIGS. 1(a) and 1(b) are lens schematic of Example 1 of the zoom lens system according to the invention.
Figure 1B:
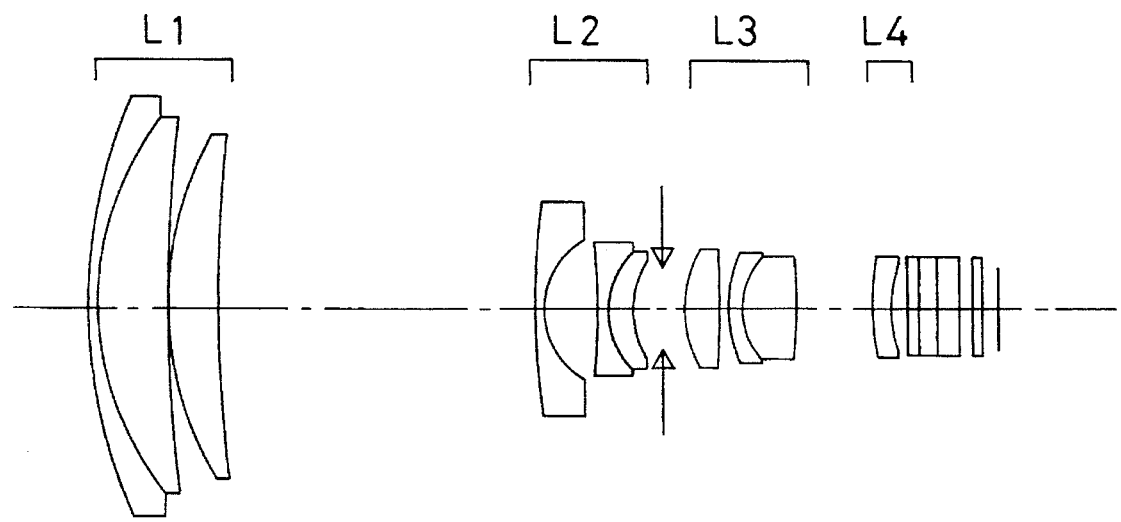
Figure 2A:
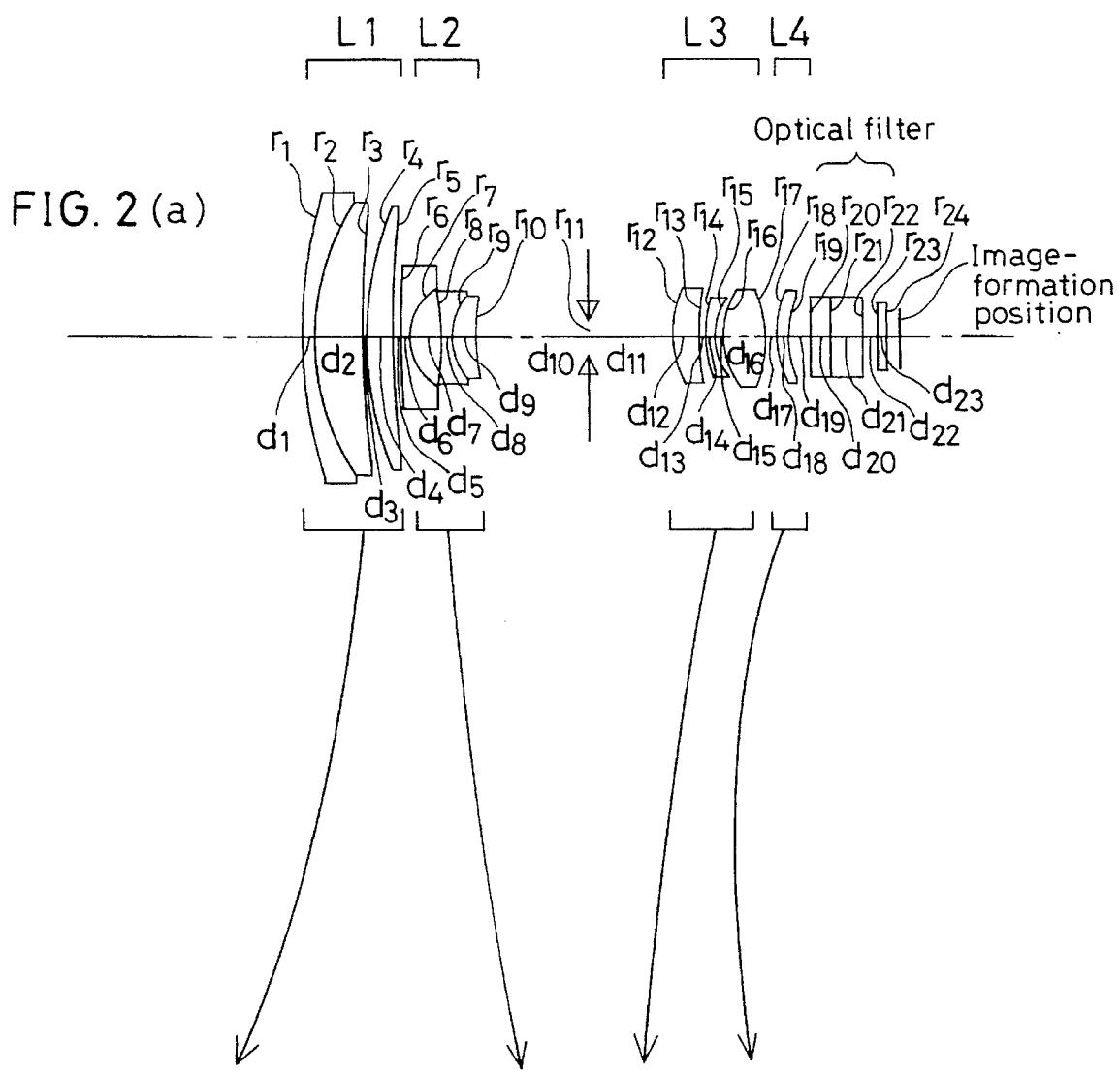
FIGS. 2(a) and 2(b) are lens schematics of Example 4.
Figure 2B:
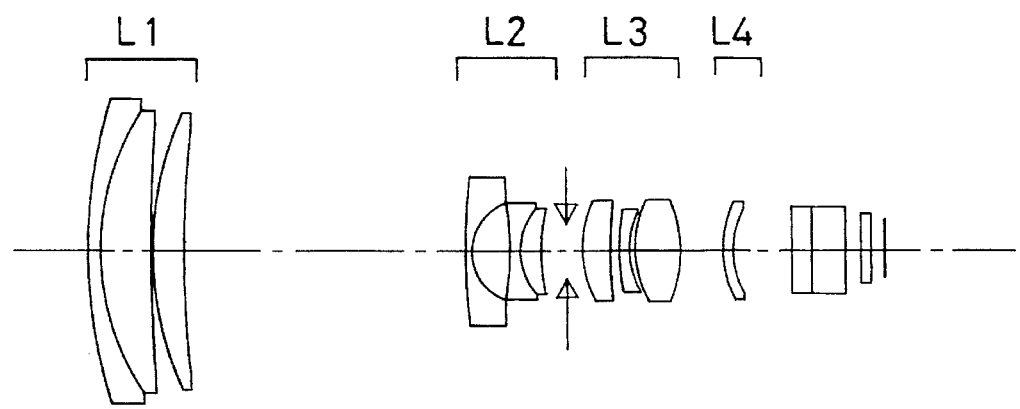

Examples 1 through 5 of the zoom lens system according to the invention will now be explained.

Sections of the lens systems according to Examples 1 and 4 at the wide-angle ends (shown by a suffix (a)) and the telephoto ends (shown by a suffix (b)). Sections of Examples 2, 3 and 5 are not illustrated because of substantial similarity to Example 1.

In Example 1, the first lens unit L1 consists of three lenses, i.e., a cemented lens element made up of a negative meniscus lens convex on the object side and a positive meniscus lens convex on the object side and a positive meniscus lens convex on the object side; the second lens unit L2 consists of three lenses, i.e., a negative meniscus lens convex on the object side and a cemented lens element made up of a double-concave lens and a positive meniscus lens convex on the object side; the third lens unit L3 consists of three lenses, i.e., a double-convex lens and a cemented lens element made up of a negative meniscus lens convex on the object side and a double-convex lens; and the fourth lens unit L4 consists of one negative meniscus lens convex on the object side; with an aperture stop located between the second and third lens units L2 and L3. This lens arrangement is followed by an optical member such as a filter for Moiré removal, e.g., a low-pass filter made up of a cemented plate element of three parallel plain plates and a parallel plain plate spaced away therefrom, or an optical filter, e.g., an infrared cut filter, and then an image-formation position at which an image pickup element is located.

In Example 2, the first lens unit L1 consists of three lenses, i.e., a cemented lens element made up of a negative meniscus lens convex on the object side and a double-convex lens and a positive meniscus lens convex on the object side; the second lens unit L2 consists of three lenses, i.e., a negative meniscus lens convex on the object side and a cemented lens element made up of a double-concave lens and a positive meniscus lens convex on the object side; the third lens unit L3 consists of three lenses, i.e., a positive meniscus lens convex on the object side and a cemented lens element made up of a negative meniscus lens convex on the object side and a double-convex lens; and the fourth lens unit L4 consists of one positive meniscus lens convex on the object side; with an aperture stop located between the second and third lens units L2 and L3. This lens arrangement is followed by an optical member such as a filter for Moiré removal, e.g., a low-pass filter made up of a cemented plate element of two parallel plain plates and a parallel plain plate spaced away therefrom, or an optical filter, e.g., an infrared cut filter, and then an image-formation position at which an image pickup element is located.

In Example 3 or 5, the first lens unit L1 consists of three lenses, i.e., a cemented lens element made up of a negative meniscus lens convex on the object side and a positive meniscus lens convex on the object side and a positive meniscus lens convex on the object side; the second lens unit L2 consists of three lenses, i.e., a negative meniscus lens convex on the object side and a cemented lens element made up of a double-concave lens and a positive meniscus lens convex on the object side; the third lens unit L3 consists of three lenses, i.e., a positive meniscus lens convex on the object side and a cemented lens element made up of a negative meniscus lens convex on the object side and a double-convex lens; and the fourth lens unit L4 consists of one positive meniscus lens convex on the object side; with a stop located between the second and third lens units. This lens arrangement is followed by an optical member such as a filter for Moiré removal, e.g., a low-pass filter made up of a cemented plate element of three parallel plain plates and a parallel plain plate spaced away therefrom, or an optical filter, e.g., an infrared cut filter, and then an image-formation position at which an image pickup element is located.

In Example 4, the first lens unit L1 consists of three lenses, i.e., a cemented lens element made up of a negative meniscus lens convex on the object side and a positive meniscus lens convex on the object side, and a positive meniscus lens convex on the object side; the second lens unit L2 consists of three lenses, i.e., a negative meniscus lens convex on the object side and a cemented lens element made up of a double-concave lens and a positive meniscus lens convex on the object side; the third lens unit L3 consists of three lenses, i.e., a positive meniscus lens convex on the object side, a negative meniscus lens concave on the object side and a double-convex lens; and the fourth lens unit L4 consists of one positive meniscus lens convex on the object side, with an aperture stop located between the second and third lens units L2 and L3. This lens arrangement is followed by an optical member such as a filter for Moiré removal, e.g., a low-pass filter made up of a cemented plate element of three parallel plain plates and a parallel plain plate spaced away therefrom, or an optical filter, e.g., an infrared cut filter, and then an image-formation position at which an image pickup element is located.

In any example, one aspheric surface is located on the surface of the third lens unit L3 proximate to the object side, while another aspheric surface is disposed on the surface of the fourth lens unit L4 proximate to the object side. In Example 2, however, an additional aspheric surface is located on the second surface of the third lens unit L3, as counted from the object side. It is here understood that aspheric surfaces may be disposed on other surfaces.

In any example, the image-formation position with respect to an infinite object point is spaced 1.27 mm away from the final surface of the optical filter or the like. An aperture stop is fixed between the second and third lens unit L2 and L3 along the optical axis, whereby the height of the off-axis ray passing through each lens unit is kept proper in view of making up for aberrations and making the diameter of the lens system small. Also the fixation of the aperture stop along the optical axis is favorable for making the structure of the lens barrel simple and compact.

Figure 8A:
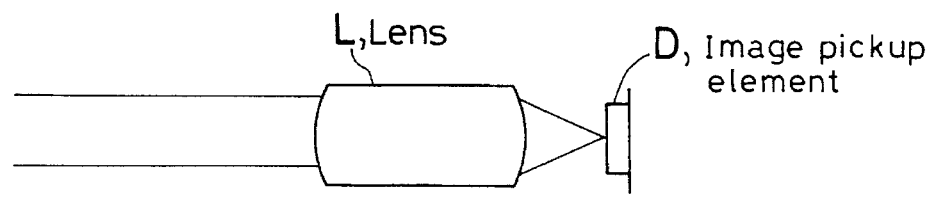
Figure 8B:
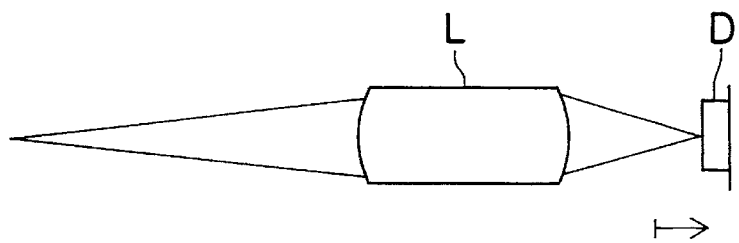
Figure 9:
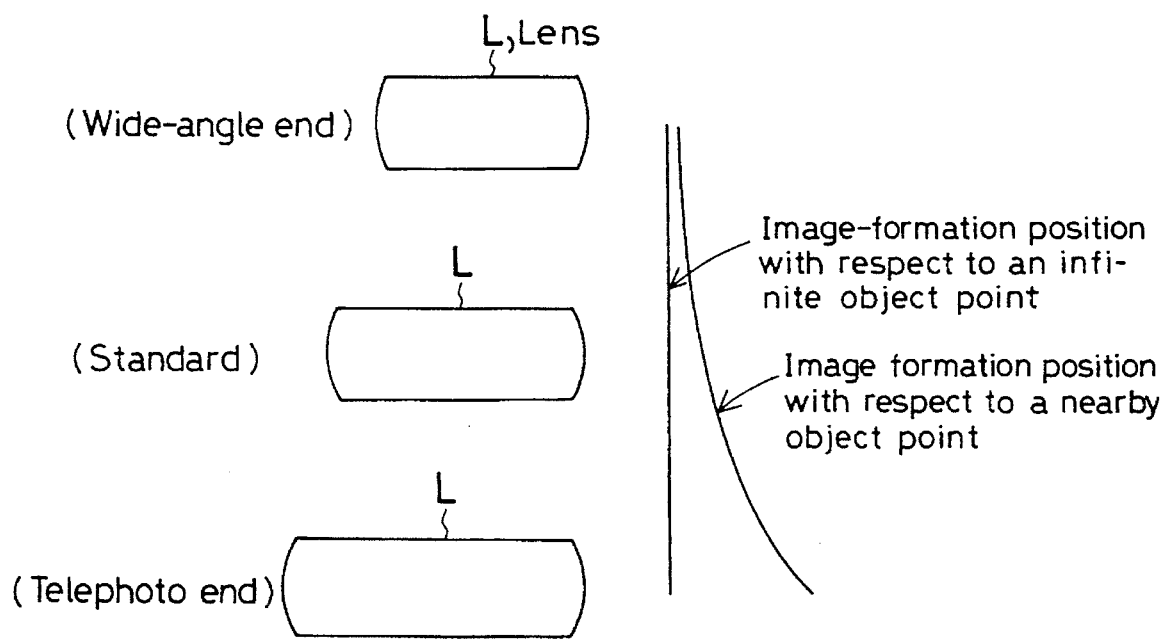
FIG. 9 is a view showing how the image-formation position with respect to a nearby object point changes depending on focal length.

As illustrated in FIG. 8, an image pickup element is disposed on the image-formation position, and is designed to be moved back and forth for focusing.

Set out below are the lens data of each example. Symbols referred to hereinafter but not hereinbefore have the following meanings.

f: the focal length of the overall system $F_{NO}$: F-number

ω: the half field angle $f_B$: the back focus $f_B'$: the back focus when the optical member such as the optical filter is removed from between the fourth lens unit L4 and the image-formation position $r_1, r_2 \ldots$ : the radius of curvature of each lens surface $d_1, d_2 \ldots$ : the separation between adjacent lens surfaces $n_{d1}, n_{d2}, \ldots$ : the d-line refractive index of each lens $v_{d1}, v_{d2}, \ldots$ : the Abbe's number of each lens Here let x and y denote the direction of the optical axis and the direction perpendicular thereto. Then, the aspheric surface shape is given by $$x = cy^2/\{1+(1-c^2y^2)^{1/2}\} + A_4 y^4 + A_6 y^6 + A_8 y^8$$

with the proviso that $c=1/r$ where r is the radius of curvature on the optical axis, and $A_4$, $A_6$ and $A_8$ are the aspheric coefficients.

EXAMPLE 1 f = 4.00~14.14~38.80
$F_{NO}$ = 1.80~2.42~2.79
ω = 38.2°~12.6°~4.6°
$f_B$ = 1.27~1.27~1.27
$f_{B'}$ = 6.88~8.91~6.65

| | | | | | | | |
|---|---|---|---|---|---|---|---|
| $r_1$ = | 58.7998 | | $d_1$ = 1.0000 | | $n_{d1}$ = 1.84666 | $v_{d1}$ = 23.78 |
| $r_2$ = | 25.2433 | | $d_2$ = 5.5630 | | $n_{d2}$ = 1.60311 | $v_{d2}$ = 60.70 |
| $r_3$ = | 129.0188 | | $d_3$ = 0.1500 | | | |
| $r_4$ = | 28.5316 | | $d_4$ = 3.5166 | | $n_{d3}$ = 1.60311 | $v_{d3}$ = 60.70 |
| $r_5$ = | 90.8401 | | $d_5$ = (Variable) | | | |
| $r_6$ = | 71.8525 | | $d_6$ = 0.8000 | | $n_{d4}$ = 1.69680 | $v_{d4}$ = 55.52 |
| $r_7$ = | 6.1802 | | $d_7$ = 4.0886 | | | |
| $r_8$ = | −65.4944 | | $d_8$ = 0.8000 | | $n_{d5}$ = 1.48749 | $v_{d5}$ = 70.20 |
| $r_9$ = | 6.1694 | | $d_9$ = 2.2396 | | $n_{d6}$ = 1.80518 | $v_{d6}$ = 25.43 |
| $r_{10}$ = | 9.6531 | | $d_{10}$ = (Variable) | | | |
| $r_{11}$ = | ∞ | (Stop) | $d_{11}$ = (Variable) | | | |
| $r_{12}$ = | 8.5843 | (Aspheric) | $d_{12}$ = 2.8787 | | $n_{d7}$ = 1.66524 | $v_{d7}$ = 55.10 |
| $r_{13}$ = | −698.1691 | | $d_{13}$ = 0.5000 | | | |
| $r_{14}$ = | 11.0026 | | $d_{14}$ = 1.000 | | $n_{d8}$ = 1.84666 | $v_{d8}$ = 23.78 |
| $r_{15}$ = | 5.3377 | | $d_{15}$ = 4.5348 | | $n_{d9}$ = 1.48749 | $v_{d9}$ = 70.20 |
| $r_{16}$ = | −19.2158 | | $d_{16}$ = (Variable) | | | |
| $r_{17}$ = | 19.4525 | (Aspheric) | $d_{17}$ = 1.5000 | | $n_{d10}$ = 1.48749 | $v_{d10}$ = 70.20 |
| $r_{18}$ = | 16.8369 | | $d_{18}$ = (Variable) | | | |
| $r_{19}$ = | ∞ | | $d_{19}$ = 0.7700 | | $n_{d11}$ = 1.54771 | $v_{d11}$ = 62.83 |
| $r_{20}$ = | ∞ | | $d_{20}$ = 1.6000 | | $n_{d12}$ = 1.52420 | $v_{d12}$ = 70.20 |
| $r_{21}$ = | ∞ | | $d_{21}$ = 1.8600 | | $n_{d13}$ = 1.54771 | $v_{d13}$ = 62.83 |
| $r_{22}$ = | ∞ | | $d_{22}$ = 1.0000 | | | |
| $r_{23}$ = | ∞ | | $d_{23}$ = 0.7500 | | $n_{d14}$ = 1.48749 | $v_{d14}$ = 70.20 |
| $r_{24}$ = | ∞ | | | | | |

Zooming Spaces

| f | 4.00 | 14.14 | 38.80 |
|---|---|---|---|
| $d_5$ | 0.800 | 16.143 | 25.223 |
| $d_{10}$ | 12.562 | 5.414 | 1.860 |
| $d_{11}$ | 6.712 | 3.282 | 1.852 |
| $d_{16}$ | 0.801 | 2.203 | 5.889 |
| $d_{18}$ | 1.357 | 3.385 | 1.130 |

Aspherical Coefficients

12th surface $A_4 = -0.16720 \times 10^{-3}$
$A_6 = -0.14393 \times 10^{-5}$
$A_8 = 0$ 17th surface $A_4 = -0.66806 \times 10^{-3}$
$A_6 = -0.41146 \times 10^{-5}$
$A_8 = 0$

EXAMPLE 2 f = 3.00~9.63~30.00
$F_{NO}$ = 1.79~2.25~2.36
ω = 38.2°~13.8°~4.5°
$f_B$ = 1.27~1.27~1.27
$f_{B'}$ = 7.20~9.65~8.51

| | | | | | |
|---|---|---|---|---|---|
| $r_1$ = | 35.6010 | $d_1$ = 1.0005 | | $n_{d1}$ = 1.84666 | $v_{d1}$ = 23.78 |
| $r_2$ = | 22.2271 | $d_2$ = 4.2801 | | $n_{d2}$ = 1.48749 | $v_{d2}$ = 70.20 |
| $r_3$ = | −780.3781 | $d_3$ = 0.1500 | | | |
| $r_4$ = | 23.6270 | $d_4$ = 2.8936 | | $n_{d3}$ = 1.69680 | $v_{d3}$ = 55.52 |
| $r_5$ = | 96.0828 | $d_5$ = (Variable | | | |
| $r_6$ = | 68.5471 | $d_6$ = 0.7000 | | $n_{d4}$ = 1.72916 | $v_{d4}$ = 54.68 |
| $r_7$ = | 4.1161 | $d_7$ = 2.5160 | | | |
| $r_8$ = | −19.1173 | $d_8$ = 0.7000 | | $n_{d5}$ = 1.48749 | $v_{d5}$ = 70.20 |
| $r_9$ = | 4.9541 | $d_9$ = 1.6533 | | $n_{d6}$ = 1.84666 | $v_{d6}$ = 23.78 |

|  |  |  | f = 3.00~9.63~30.00 |  |  |
|---|---|---|---|---|---|
|  |  |  | $F_{NO}$ = 1.79~2.25~2.36 |  |  |
|  |  |  | ω = 38.2°~13.8°~4.5° |  |  |
|  |  |  | $f_B$ = 1.27~1.27~1.27 |  |  |
|  |  |  | $f_{B'}$ = 7.20~9.65~8.51 |  |  |
| $r_{10}$ = | 9.2595 |  | $d_{10}$ = (Variable) |  |  |
| $r_{11}$ = | ∞ | (Stop) | $d_{11}$ = (Variable |  |  |
| $r_{12}$ = | 7.4546 | (Aspheric) | $d_{12}$ = 1.8519 | $n_{d7}$ = 1.66524 | $v_{d7}$ = 55.10 |
| $r_{13}$ = | 31.6060 | (Aspheric) | $d_{13}$ = 0.1500 |  |  |
| $r_{14}$ = | 10.1294 |  | $d_{14}$ = 0.7500 | $n_{d8}$ = 1.84666 | $v_{d8}$ = 23.78 |
| $r_{15}$ = | 5.1559 |  | $d_{15}$ = 4.1872 | $n_{d9}$ = 1.48749 | $v_{d9}$ = 70.20 |
| $r_{16}$ = | −9.2741 |  | $d_{16}$ = (Variable) |  |  |
| $r_{17}$ = | 17.4292 | (Aspheric) | $d_{17}$ = 1.0000 | $n_{d10}$ = 1.51633 | $v_{d10}$ = 64.15 |
| $r_{18}$ = | 44.1791 |  | $d_{18}$ = (Variable) |  |  |
| $r_{19}$ = | ∞ |  | $d_{19}$ = 1.6000 | $n_{d11}$ = 1.52420 | $v_{d11}$ = 70.20 |
| $r_{20}$ = | ∞ |  | $d_{20}$ = 2.9000 | $n_{d12}$ = 1.54771 | $v_{d12}$ = 62.83 |
| $r_{21}$ = | ∞ |  | $d_{21}$ = 1.2000 |  |  |
| $r_{22}$ = | ∞ |  | $d_{22}$ = 0.7500 | $n_{d13}$ = 1.8749 | $v_{d13}$ = 70.20 |
| $r_{23}$ = | ∞ |  |  |  |  |

Zooming Spaces

| f | 3.00 | 9.63 | 30.00 |
|---|---|---|---|
| $d_5$ | 0.597 | 10.866 | 19.717 |
| $d_{10}$ | 7.444 | 3.698 | 1.800 |
| $d_{11}$ | 5.966 | 2.391 | 1.500 |
| $d_{16}$ | 0.800 | 1.928 | 3.960 |
| $d_{18}$ | 1.303 | 3.750 | 2.610 |

Aspherical Coefficients

12th surface $A_4 = -0.11828 \times 10^{-3}$
$A_6 = 0.31601 \times 10^{-5}$
$A_8 = -0.67851 \times 10^{-6}$ 13th surface $A_4 = 0.32089 \times 10^{-3}$
$A_6 = 0.48247 \times 10^{-4}$
$A_8 = -0.68322 \times 10^{-6}$ 17th surface $A_4 = -0.38335 \times 10^{-3}$
$A_6 = -0.54393 \times 10^{-5}$
$A_8 = 0.29312 \times 10^{-5}$

EXAMPLE 3

|  |  |  | f = 3.00~9.63~36.00 |  |  |
|---|---|---|---|---|---|
|  |  |  | $F_{NO}$ = 1.81~2.76~2.79 |  |  |
|  |  |  | ω = 38.2°~13.8°~3.8° |  |  |
|  |  |  | $f_B$ = 1.27~1.27~1.27 |  |  |
|  |  |  | $f_{B'}$ = 7.63~12.94~11.70 |  |  |
| $r_1$ = | 37.5685 |  | $d_1$ = 1.0005 | $n_{d1}$ = 1.80518 | $v_{d1}$ = 25.43 |
| $r_2$ = | 21.0977 |  | $d_2$ = 4.1763 | $n_{d2}$ = 1.69680 | $v_{d2}$ = 55.52 |
| $r_3$ = | 568.2017 |  | $d_3$ = 0.1500 |  |  |
| $r_4$ = | 33.1352 |  | $d_4$ = 1.6023 | $n_{d3}$ = 1.69680 | $v_{d3}$ = 55.52 |
| $r_5$ = | 57.4032 |  | $d_5$ = (Variable) |  |  |
| $r_6$ = | 40.9868 |  | $d_6$ = 0.7000 | $n_{d4}$ = 1.72916 | $v_{d4}$ = 54.68 |
| $r_7$ = | 4.7744 |  | $d_7$ = 3.5737 |  |  |
| $r_8$ = | −12.1975 |  | $d_8$ = 0.7000 | $n_{d5}$ = 1.48749 | $v_{d5}$ = 70.20 |
| $r_9$ = | 7.2811 |  | $d_9$ = 1.7049 | $n_{d6}$ = 1.84666 | $v_{d6}$ = 23.78 |
| $r_{10}$ = | 16.9962 |  | $d_{10}$ = (Variable) |  |  |
| $r_{11}$ = | ∞ | (Stop) | $d_{11}$ = (Variable) |  |  |
| $r_{12}$ = | 7.3259 | (Aspheric) | $d_{12}$ = 2.4197 | $n_{d7}$ = 1.67790 | $v_{d7}$ = 55.33 |
| $r_{13}$ = | 22.9132 |  | $d_{13}$ = 0.1500 |  |  |
| $r_{14}$ = | 11.3567 |  | $d_{14}$ = 0.7500 | $n_{d8}$ = 1.84666 | $v_{d8}$ = 23.78 |
| $r_{15}$ = | 5.4643 |  | $d_{15}$ = 4.4044 | $n_{d9}$ = 1.48749 | $v_{d9}$ = 70.20 |
| $r_{16}$ = | −13.0990 |  | $d_{16}$ = (Variable) |  |  |
| $r_{17}$ = | 7.7285 | (Aspheric) | $d_{17}$ = 1.0000 | $n_{d10}$ = 1.51633 | $v_{d10}$ = 64.15 |
| $r_{18}$ = | 10.0613 |  | $d_{18}$ = (Variable) |  |  |
| $r_{19}$ = | ∞ |  | $d_{19}$ = 1.6000 | $n_{d11}$ = 1.52420 | $v_{d11}$ = 70.20 |
| $r_{20}$ = | ∞ |  | $d_{20}$ = 2.9000 | $n_{d12}$ = 1.54771 | $v_{d12}$ = 62.83 |
| $r_{21}$ = | ∞ |  | $d_{21}$ = 1.2000 |  |  |

-continued $f = 3.00\sim9.63\sim36.00$
$F_{NO} = 1.81\sim2.76\sim2.79$
$\omega = 38.2°\sim13.8°\sim3.8°$
$f_B = 1.27\sim1.27\sim1.27$
$f_{B'} = 7.63\sim12.94\sim11.70$

| | | | | |
|---|---|---|---|---|
| $r_{22} = \infty$ | | $d_{22} = 0.7500$ | $n_{d13} = 1.48749$ | $v_{d13} = 70.20$ |
| $r_{23} = \infty$ | | | | |

Zooming Spaces

| f | 3.00 | 9.63 | 36.00 |
|---|---|---|---|
| $d_5$ | 0.600 | 7.816 | 25.382 |
| $d_{10}$ | 10.303 | 4.210 | 1.800 |
| $d_{11}$ | 7.833 | 1.733 | 1.500 |
| $d_{16}$ | 0.800 | 1.591 | 3.055 |
| $d_{18}$ | 1.729 | 7.039 | 5.807 |

Aspherical Coefficients

12th surface $A_4 = -0.22878 \times 10^{-3}$
$A_6 = -0.32297 \times 10^{-5}$
$A_8 = 0$ 17th surface $A_4 = -0.53914 \times 10^{-3}$
$A_6 = -0.18169 \times 10^{-4}$
$A_8 = 0$

EXAMPLE 4

$f = 3.00\sim9.63\sim30.00$
$F_{NO} = 1.81\sim2.73\sim2.90$
$\omega = 38.2°\sim13.8°\sim4.5°$
$f_B = 1.27\sim1.27\sim1.27$
$f_{B'} = 7.75\sim11.77\sim10.71$

| | | | | | |
|---|---|---|---|---|---|
| $r_1 =$ | 40.5746 | | $d_1 = 1.0005$ | $n_{d1} = 1.80518$ | $v_{d1} = 25.43$ |
| $r_2 =$ | 19.8939 | | $d_2 = 4.1324$ | $n_{d2} = 1.72000$ | $v_{d2} = 50.25$ |
| $r_3 =$ | 125.3564 | | $d_3 = 0.1500$ | | |
| $r_4 =$ | 28.6682 | | $d_4 = 2.4117$ | $n_{d3} = 1.69680$ | $v_{d3} = 55.52$ |
| $r_5 =$ | 94.5524 | | $d_5 =$ (Variable) | | |
| $r_6 =$ | 67.4469 | | $d_6 = 0.7000$ | $n_{d4} = 1.72916$ | $v_{d4} = 54.68$ |
| $r_7 =$ | 4.4654 | | $d_7 = 2.9269$ | | |
| $r_8 =$ | −16.2141 | | $d_8 = 0.7000$ | $n_{d5} = 1.48749$ | $v_{d5} = 70.20$ |
| $r_9 =$ | 5.8247 | | $d_9 = 1.7414$ | $n_{d6} = 1.84666$ | $v_{d6} = 23.78$ |
| $r_{10} =$ | 11.8089 | | $d_{10} =$ (Variable) | | |
| $r_{11} =$ | $\infty$ | (Stop) | $d_{11} =$ (Variable) | | |
| $r_{12} =$ | 7.2138 | (Aspheric) | $d_{12} = 2.5218$ | $n_{d7} = 1.66524$ | $v_{d7} = 55.12$ |
| $r_{13} =$ | 29.3987 | | $d_{13} = 0.5620$ | | |
| $r_{14} =$ | 12.3117 | | $d_{14} = 0.7500$ | $n_{d8} = 1.84666$ | $v_{d8} = 23.78$ |
| $r_{15} =$ | 5.8164 | | $d_{15} = 0.4916$ | | |
| $r_{16} =$ | 6.5358 | | $d_{16} = 3.8307$ | $n_{d9} = 1.48749$ | $v_{d9} = 70.20$ |
| $r_{17} =$ | −10.3752 | | $d_{17} =$ (Variable) | | |
| $r_{18} =$ | 6.8793 | (Aspheric) | $d_{18} = 1.0000$ | $n_{d10} = 1.51633$ | $v_{d10} = 64.15$ |
| $r_{19} =$ | 8.3071 | | $d_{19} =$ (Variable) | | |
| $r_{20} =$ | $\infty$ | | $d_{20} = 1.6000$ | $n_{d11} = 1.52420$ | $v_{d11} = 70.20$ |
| $r_{21} =$ | $\infty$ | | $d_{21} = 2.9000$ | $n_{d12} = 1.54771$ | $v_{d12} = 62.83$ |
| $r_{22} =$ | $\infty$ | | $d_{22} = 1.2000$ | | |
| $r_{23} =$ | $\infty$ | | $d_{23} = 0.7500$ | $n_{d13} = 1.48749$ | $v_{d13} = 70.20$ |
| $r_{24} =$ | $\infty$ | | | | |

Zooming Spaces

| f | 3.00 | 9.63 | 30.00 |
|---|---|---|---|
| $d_5$ | 0.600 | 10.417 | 23.269 |
| $d_{10}$ | 9.525 | 4.284 | 1.800 |
| $d_{11}$ | 6.914 | 2.193 | 1.500 |
| $d_{17}$ | 0.800 | 1.500 | 3.254 |
| $d_{19}$ | 1.854 | 5.875 | 4.814 |

-continued $f = 3.00 \sim 9.63 \sim 30.00$
$F_{NO} = 1.81 \sim 2.73 \sim 2.90$
$\omega = 38.2° \sim 13.8° \sim 4.5°$
$f_B = 1.27 \sim 1.27 \sim 1.27$
$f_{B'} = 7.75 \sim 11.77 \sim 10.71$ Aspherical Coefficients 12th surface $A_4 = -0.28051 \times 10^{-3}$
$A_6 = -0.35930 \times 10^{-5}$
$A_8 = 0$ 18th surface $A_4 = -0.49126 \times 10^{-3}$
$A_6 = -0.19754 \times 10^{-4}$
$A_8 = 0$

EXAMPLE 5

$f = 3.50 \sim 9.63 \sim 28.00$
$F_{NO} = 1.80 \sim 2.35 \sim 2.63$
$\omega = 34.0° \sim 13.8° \sim 4.8°$
$f_B = 1.27 \sim 1.27 \sim 1.27$
$f_{B'} = 7.44 \sim 8.94 \sim 7.83$

| | | | | | |
|---|---|---|---|---|---|
| $r_1 =$ | 36.6886 | | $d_1 = 1.0005$ | $n_{d1} = 1.80518$ | $\nu_{d1} = 25.43$ |
| $r_2 =$ | 18.3787 | | $d_2 = 4.0514$ | $n_{d2} = 1.69680$ | $\nu_{d2} = 55.52$ |
| $r_3 =$ | 149.9834 | | $d_3 = 0.1500$ | | |
| $r_4 =$ | 20.6667 | | $d_4 = 2.6369$ | $n_{d3} = 1.69680$ | $\nu_{d3} = 55.52$ |
| $r_5 =$ | 57.7017 | | $d_5 =$ (Variable) | | |
| $r_6 =$ | 19.2501 | | $d_6 = 0.7000$ | $n_{d4} = 1.72916$ | $\nu_{d4} = 54.68$ |
| $r_7 =$ | 3.5182 | | $d_7 = 2.3195$ | | |
| $r_8 =$ | −13.1876 | | $d_8 = 0.7000$ | $n_{d5} = 1.48749$ | $\nu_{d5} = 70.20$ |
| $r_9 =$ | 4.7252 | | $d_9 = 1.7239$ | $n_{d6} = 1.84666$ | $\nu_{d6} = 23.78$ |
| $r_{10} =$ | 9.8267 | | $d_{10} =$ (Variable) | | |
| $r_{11} =$ | ∞ | (Stop) | $d_{11} =$ (Variable) | | |
| $r_{12} =$ | 7.2803 | (Aspheric) | $d_{12} = 1.6927$ | $n_{d7} = 1.66524$ | $\nu_{d7} = 55.10$ |
| $r_{13} =$ | 30.8941 | | $d_{13} = 0.1500$ | | |
| $r_{14} =$ | 10.0308 | | $d_{14} = 0.7500$ | $n_{d8} = 1.84666$ | $\nu_{d8} = 23.78$ |
| $r_{15} =$ | 4.9438 | | $d_{15} = 3.5268$ | $n_{d9} = 1.48749$ | $\nu_{d9} = 70.20$ |
| $r_{16} =$ | −9.8396 | | $d_{16} =$ (Variable) | | |
| $r_{17} =$ | 8.0480 | (Aspheric) | $d_{17} = 1.0000$ | $n_{d10} = 1.51633$ | $\nu_{d10} = 64.15$ |
| $r_{18} =$ | 13.3792 | | $d_{18} =$ (Variable) | | |
| $r_{19} =$ | ∞ | | $d_{19} = 1.6000$ | $n_{d11} = 1.52420$ | $\nu_{d11} = 70.20$ |
| $r_{20} =$ | ∞ | | $d_{20} = 2.9000$ | $n_{d12} = 1.54771$ | $\nu_{d12} = 62.83$ |
| $r_{21} =$ | ∞ | | $d_{21} = 1.2000$ | | |
| $r_{22} =$ | ∞ | | $d_{22} = 0.7500$ | $n_{d13} = 1.48749$ | $\nu_{d13} = 70.20$ |
| $r_{23} =$ | ∞ | | | | |

Zooming Spaces

| f | 3.50 | 9.63 | 28.00 |
|---|---|---|---|
| $d_5$ | 0.600 | 9.950 | 17.167 |
| $d_{10}$ | 5.900 | 3.557 | 1.800 |
| $d_{11}$ | 5.002 | 2.500 | 1.500 |
| $d_{16}$ | 0.800 | 1.796 | 3.914 |
| $d_{18}$ | 1.540 | 3.046 | 1.928 |

Aspherical Coefficients

12th surface $A_4 = -0.25526 \times 10^{-3}$
$A_6 = -0.51982 \times 10^{-5}$
$A_8 = -0.13089 \times 10^{-6}$ 17th surface $A_4 = -0.76985 \times 10^{-3}$
$A_6 = -0.12041 \times 10^{-4}$
$A_8 = 0.34895 \times 10^{-6}$ Shown in FIGS. 3 through 7 are the spherical aberrations, astigmatisms, distortions and chromatic aberrations of magnification of Examples 1 through 5 at the wide-angle ends (shown by a suffix (a)), in the standard settings (shown by a suffix (b)), and the telephoto ends (shown by a suffix (c)). Also set out below are the values given by Conditional Inequalities (1) through (7) in Examples 1 through 5.

| Inequalities | Ex. 1 | Ex. 2 | Ex. 3 | Ex. 4 | Ex. 5 |
| --- | --- | --- | --- | --- | --- |
| (1) | 3.65 | 3.48 | 4.01 | 3.62 | 3.06 |
| (2) | −0.90 | −0.92 | −0.81 | −0.96 | −1.03 |
| (3) | 4.60 | 5.19 | 5.01 | 5.72 | 5.09 |
| (4) | 2.17 | 2.69 | 2.09 | 2.72 | 3.24 |
| (5) | 0.78 | 0.42 | 0.52 | 0.52 | 0.33 |
| (6) | 1.00 | 0.83 | 0.75 | 0.78 | 0.75 |
| (7) | −0.03 | 0.15 | 0.18 | 0.16 | 0.23 |

Figure 10:
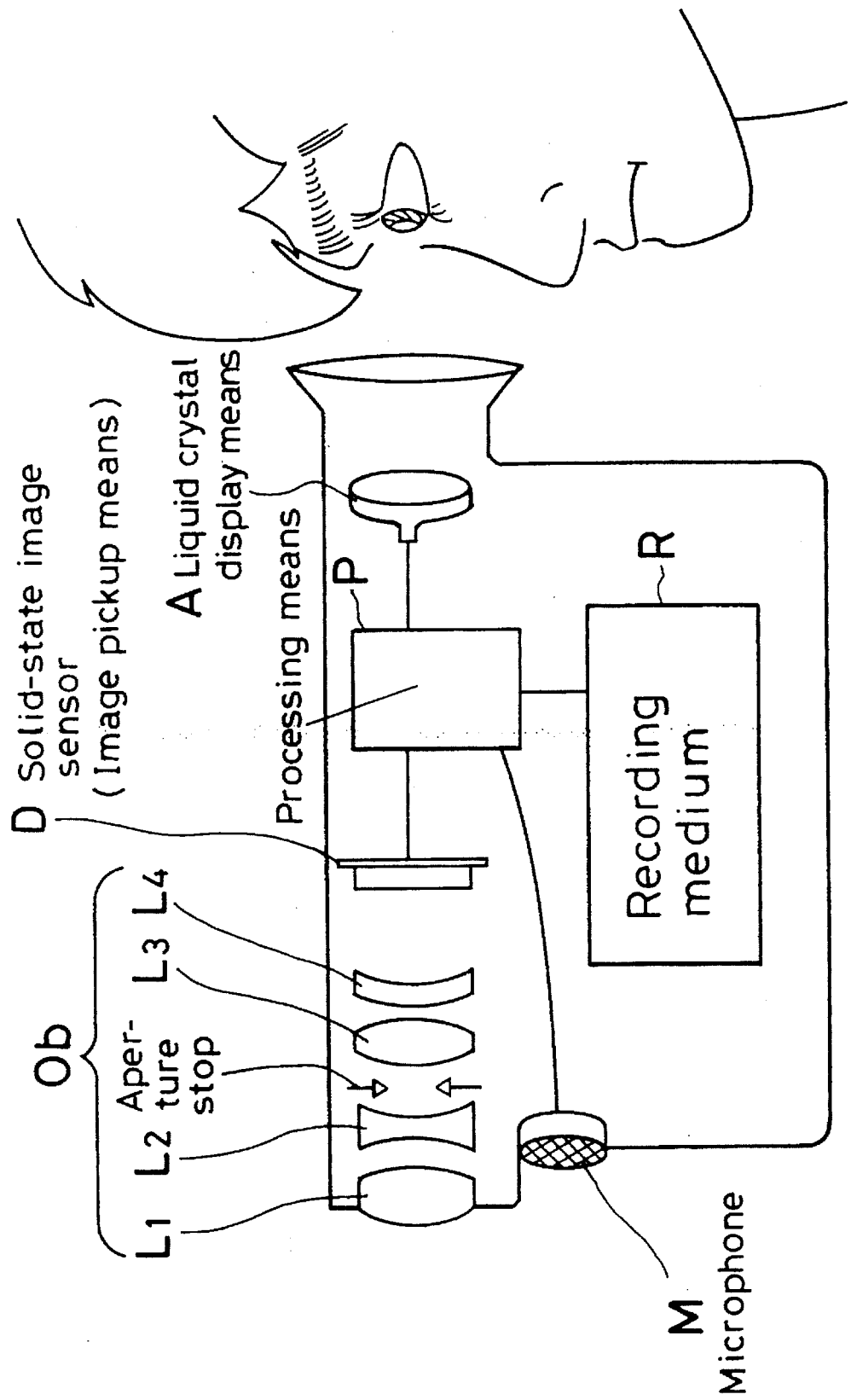
FIG. 10 is an overall system schematic of a video camera in which the zoom lens system of the invention is used as an objective lens assembly.

One example of an electronic imaging device, specifically, a video camera, in which the zoom lens system comprising the above lens units L1 through L4 according to the invention is used as an objective lens Ob is presented in the form of an overall system schematic in FIG. 10. A solid-state image sensor D is disposed on the image-formation surface of the objective lens Ob as an image pickup means in a focusable manner. An image is converted by the solid-state image sensor D into an image signal, which is then electrically processed by a processing means P into a signal that can be displayed on a liquid crystal display element A, and is recordable on a magnetic tape that is a recording medium R. A sound signal simultaneously inputted through a microphone M, too, is electrically converted by this processing means P into a signal that is recordable on the recording medium R. It is noted that any desired monitorable image display means, e.g., a CRT, may be used in place of the liquid crystal display element A that is one example of the image display means.

According to the invention, it is possible to provide a zoom lens system which has a zoom ratio as high as about 8 to 12 but is of wide field angle and small size. The zoom lens system of the invention is particularly suitable for use on a video camera.

What we claim is:

1. A zoom lens system comprising, in order from the object side, a first lens unit which is movable along the optical axis and in zooming from a wide-angle end to a telephoto end, said first lens unit being relatively displaceable toward the object side at the telephoto end position rather than at the wide-angle end position, and has positive refracting power as a whole, a second lens unit which is movable along the optical axis and in an orbit for zooming from the wide-angle end to the telephoto end, said orbit being relatively displaceable toward the image side at the telephoto end position rather than at the wide-angle end position, and has negative refracting power as a whole, a third lens unit which is movable along the optical axis and in an orbit for zooming from the wide-angle end to the telephoto end, said orbit being relatively displaceable toward the object side at the telephoto end position rather than at the wide-angle end position, and has positive refracting power as a whole, and a fourth lens unit which is movable along the optical axis for zooming from the wide-angle end to the telephoto end, and has positive or negative refracting power as a whole, and said zoom lens system conforming to the following conditions:

$$2.6 < f_I/(f_W f_T)^{1/2} < 6 \quad (1)$$

$$-1.2 < \beta_{2T} < -0.7 \quad (2)$$

$$3.2 < \beta_{2T}/\beta_{2W} < 8 \quad (3)$$

where:

$f_I$ is the focal length of the first lens unit, $f_W$ and $f_T$ are the focal lengths of the overall system at the wide-angle and telephoto ends, respectively, and $\beta_{2W}$ and $\beta_{2T}$ are the image-formation magnifications of the second lens unit at the wide-angle and telephoto ends, respectively.

2. A zoom lens system according to claim 1, wherein an image pickup device is located on a substantial image surface formed by said zoom lens system, so that the image pickup device can be moved along the optical axis for focusing.

3. A zoom lens system according to claim 1, wherein said fourth lens unit is moved such that the separation between it and the third lens unit is larger at the telephoto end rather than at the wide-angle end.

4. A zoom lens system according to claim 1, which conforms to the following condition (4):

$$1.6 < (\beta_{2T} \cdot \beta_{3W} \cdot \beta_{4W})/(\beta_{2W} \cdot \beta_{3T} \cdot \beta_{4T}) < 4.5 \quad (4)$$

where $\beta_{iW}$ is the magnification of the ith lens unit at the wide-angle end, and $\beta_{iT}$ is the magnification of the ith lens unit at the telephoto end.

5. A zoom lens system according to claim 1, which conforms to the following condition (5):

$$0.2 < |X_2/X_1| < 1.0 \quad (5)$$

where $X_1$ and $X_2$ are the amount of movement of the first and second lens units from the wide-angle end to the telephoto end, respectively.

6. A zoom lens system according to claim 1, wherein said third lens unit includes positive, negative and positive lenses in order from the object side.

7. A zoom lens system according to claim 1, wherein said third lens unit includes at least one aspheric surface with the positive refracting power becoming weak as it is spaced away from the optical axis.

8. A zoom lens system according to claim 1, wherein said third lens unit includes at least one aspheric surface with the negative refracting power becoming strong as it is spaced away from the optical axis.

9. A zoom lens system according to claim 1, wherein said fourth lens unit includes one lens, said lens having at least one aspheric surface with the positive refracting power becoming weak as it is spaced away from the optical axis.

10. A zoom lens system according to claim 1, wherein said fourth lens unit includes one lens, said lens having at least one aspheric surface with the negative refracting power becoming strong as it is spaced away from the optical axis.

11. A zoom lens system according to claim 1, wherein said third lens unit includes a positive lens having a convex surface of strong curvature on the object side, a negative meniscus lens convex on the object side, and a double-convex lens.

12. A zoom lens system according to claim 2, which conforms to the following conditions (6) and (7):

$$0.7 < \beta_{4T} < 1.4 \quad (6)$$

$$-0.2 < f_3/f_4 < 0.4 \qquad (7)$$

where $\beta_{4T}$ is the magnification of the fourth lens unit at the telephoto end, and $f_i$ is the focal length of the ith lens unit.

13. A zoom lens system according to claim 1, wherein an optical filter is provided in the rear of said fourth lens unit.

14. A zoom lens system according to claim 13, wherein said optical filter is a low-pass filter for Moiré removal.

15. A zoom lens system according to claim 13, wherein said optical filter is an infrared cut filter.

* * * * *